United States Patent [19]
Ortel et al.

[11] Patent Number: 5,715,242
[45] Date of Patent: Feb. 3, 1998

[54] SYSTEM FOR INTEGRATED DISTRIBUTION OF SWITCHED VOICE AND TELEVISION ON COAXIAL CABLE WITH PHASE DISTORTION CORRECTION

[76] Inventors: William C. G. Ortel, 125 Washington Pl., New York, N.Y. 10014; John D. Beierle, 162 Colonial Rd., No. 9, Stamford, Conn. 06906

[21] Appl. No.: 575,508

[22] Filed: Dec. 20, 1995

[51] Int. Cl.[6] .............................. H04J 4/00; H04L 12/28; H04N 7/10
[52] U.S. Cl. ..................... 370/307; 370/431; 375/371; 348/92
[58] Field of Search .................................. 370/307, 310, 370/315, 344, 431, 480, 485, 486, 487, 491, 493, 498, 500, 503, 516; 375/362, 371; 455/3.1, 3.5, 6.1; 348/6, 10, 12, 14; 379/399

[56] References Cited

U.S. PATENT DOCUMENTS

| | | | |
|---|---|---|---|
| 3,969,675 | 7/1976 | Gosling | 325/50 |
| 4,509,073 | 4/1985 | Baran et al. | 358/86 |
| 4,675,880 | 6/1987 | Davarian | 375/39 |
| 4,679,243 | 7/1987 | McGeehan et al. | 455/47 |
| 4,691,375 | 9/1987 | McGeehan et al. | 455/71 |
| 4,789,980 | 12/1988 | Darcie et al. | 370/57 |
| 4,792,985 | 12/1988 | McGeehan et al. | 455/48 |
| 4,797,735 | 1/1989 | Takai et al. | 358/86 |
| 4,802,191 | 1/1989 | McGeehan et al. | 375/43 |
| 4,947,453 | 8/1990 | McGeehan et al. | 455/47 |
| 5,157,345 | 10/1992 | Kenington et al. | 330/149 |
| 5,249,202 | 9/1993 | Hillum et al. | 375/77 |
| 5,263,021 | 11/1993 | Ortel | 370/74 |
| 5,334,946 | 8/1994 | Kenington et al. | 330/144 |
| 5,351,234 | 9/1994 | Beierle et al. | 370/49.5 |
| 5,581,555 | 12/1996 | Dubberly et al. | 370/487 |

FOREIGN PATENT DOCUMENTS

| | | | |
|---|---|---|---|
| 0664637 | 7/1995 | European Pat. Off. | H04M 11/00 |
| 2279208 | 12/1994 | United Kingdom | H04M 1/68 |
| 2298104 | 8/1996 | United Kingdom | H04M 11/00 |

OTHER PUBLICATIONS

IEEE Transactions on Communications, vol. Com. 32, No. 1, Jan., 1984, "Phase–Locked Transparent Tone–in–Band (TTIB): A New Spectrum Configuration Particularly Suited to the Transmission of Data Over SSB Mobile Radio Networks", J.P. McGeehan, Member IEEE, and A.J. Bateman.

Primary Examiner—Douglas W. Olms
Assistant Examiner—A. Bnimoussa
Attorney, Agent, or Firm—John J. Torrente; Loren C. Swingle

[57] ABSTRACT

A system for voice distribution amongst a plurality of telephone subscriber locations operating on a broadband cable network wherein RF transmitting and RF receiving channels for carrying voice and signalling information are established at the subscriber locations and coupled with the broad band network and a central switch is also coupled with the broadband network and enables each RF transmitting channel to be selectively coupled to any of the RF receiving channels. Phase correction pilot tones having a known phase relationship are generated at the telephone subscriber locations and transmitted in one or more phase correction pilot tone channels separate from the RF transmitting channels to the central switch. At the switch, the phase correction pilot tones are recovered and the phases of the pilot tones are used to correct the phases of the transmitting channels.

32 Claims, 13 Drawing Sheets

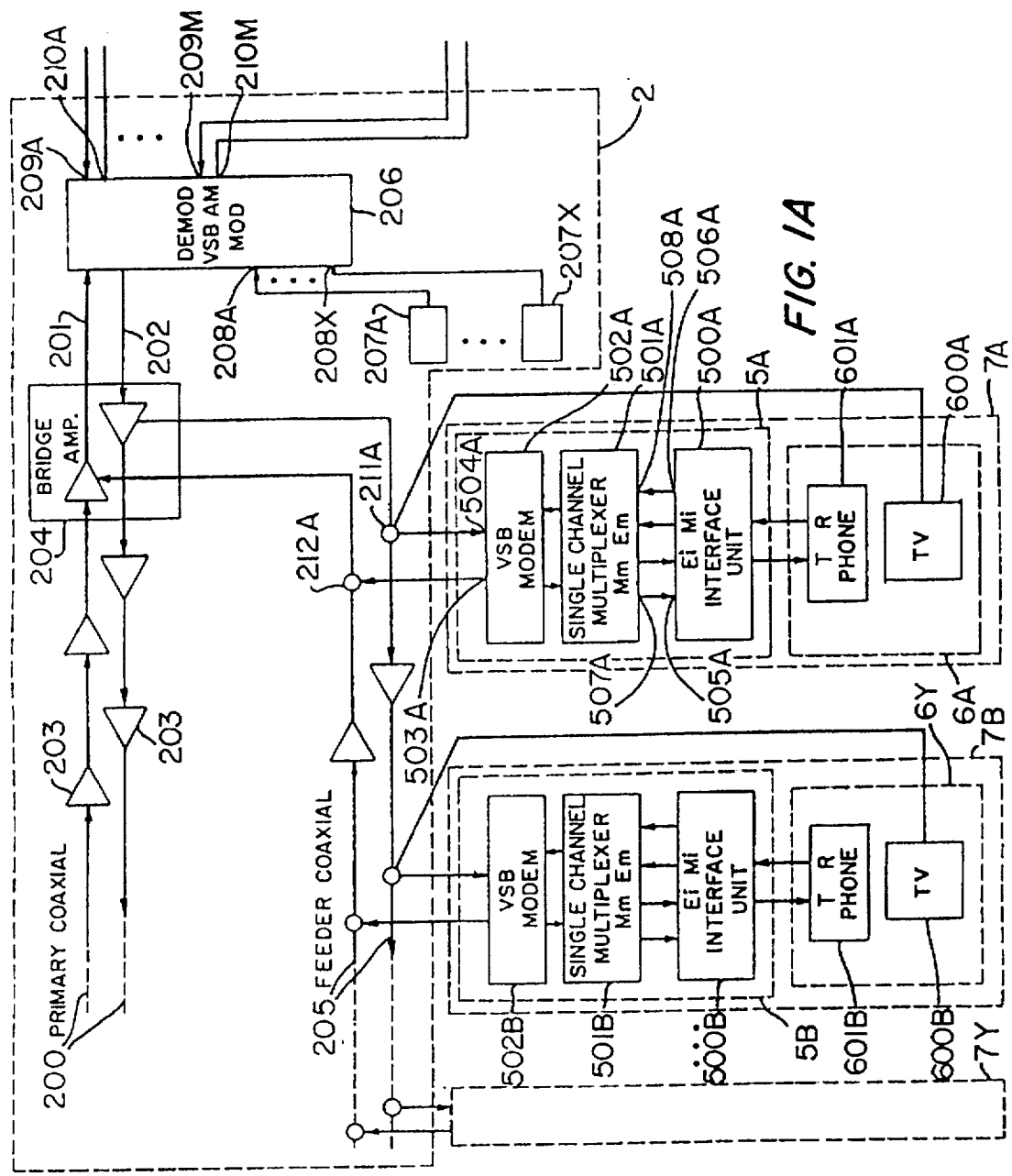
FIG. IA

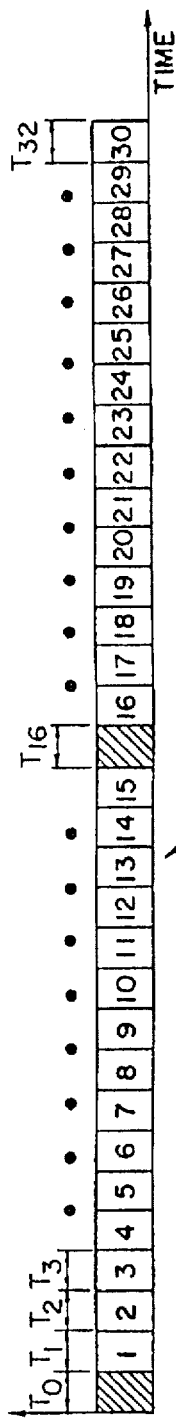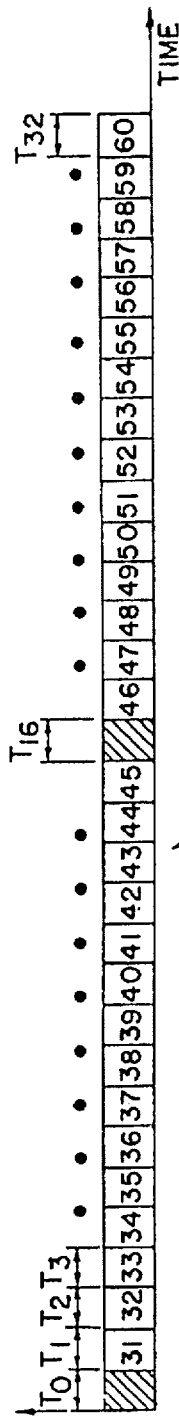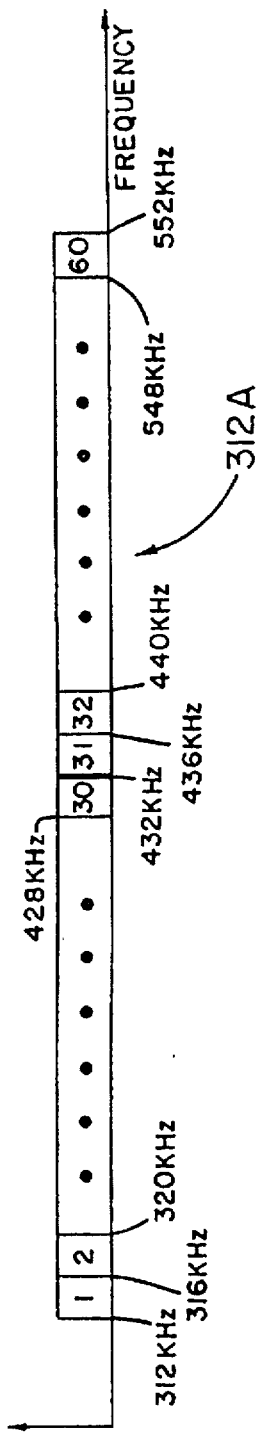

| TDM | TDM CHANNEL | FDM CARRIER | SECOND MULTIPLIER | "N" | TONE |
|---|---|---|---|---|---|
| # 1 | 1 | 312 KHz | 107 | 78 | 500 Hz |
| # 1 | 29 | 424 KHz | 107 | 106 | 2250 Hz |
| # 2 | 31 | 432 KHz | 137 | 108 | 500 Hz |
| # 2 | 59 | 544 KHz | 137 | 136 | 2250 Hz |

FIG. 7A

SYSTEM FOR INTEGRATED DISTRIBUTION OF SWITCHED VOICE AND TELEVISION ON COAXIAL CABLE WITH PHASE DISTORTION CORRECTION

BACKGROUND OF THE INVENTION

This invention relates to voice distribution and switching and, in particular, to an improved system for providing voice distribution and switching and video signals on a broadband cable network.

Video distribution systems are known wherein video signals are distributed over a broadband coaxial network to a large number of subscribers. Further, there are also known video/voice distribution systems in which a broadband coaxial network is used to provide voice distribution concurrent with video distribution.

Video/voice distribution systems are particularly advantageous in locations where broadband coaxial networks have already been installed for video distribution, but which lack independent voice distribution networks. In these locations, the cost associated with installing and maintaining an independent voice network can be eliminated by also utilizing the broadband coaxial network for voice distribution. Further, for locations which currently support voice distribution on an independent voice network, it may be desirable to add a voice distribution system to the existing coaxial video distribution system to reduce the voice traffic on the existing voice distribution network and/or to provide a redundant path for voice communications.

One example of a known video/voice distribution system utilizing a broadband coaxial network is a system proposed by First Pacific Networks (FPN). In the FPN system, corresponding broadband RF channels (typically, 6 MHz wide) serve as upstream and downstream highways for an associated group of voice channels. To avoid interference, these corresponding RF channels are offset or shifted in frequency by a fixed amount, e.g., 192.25 MHz.

The FPN system, however, lacks any centralized control. Therefore, each voice channel must carry all its requisite control information. Because of this and since the FPN system uses digital as opposed to analog transmission, each voice channel is required to be approximately 180 Kbits/second in capacity. Using typical 6 MHz upstream/downstream RF channels, a maximum of about 28 voice channels can, therefore, be carried within a given upstream/downstream RF pair.

As a result of this limited voice channel capacity, the FPN system is not readily useable where large scale voice distribution is desired. Moreover, since there is no mechanism in the FPN system for permitting voice channels assigned to one RF channel pair to be able to communicate with voice channels assigned to another RF pair, increased capacity cannot be realized merely by allocating additional RF channels to voice distribution. In any case, such allocation would reduce the number of allowable video channels and provide only a limited number of additional voice channels per RF channel pair. Finally, the FPN system requires equipment at each subscriber location to process the extensive control information carried in the associated voice channel. This increases the complexity and cost of the equipment.

A system for overcoming the disadvantages of the FPN system is disclosed in U.S. Pat. No. 5,351,234, issued on Sep. 27, 1994 and assigned to the same assignee hereof. In the '234 patent, subscriber locations establish RF transmitting and RF receiving channels for conveying voice and signalling information from and to the subscriber locations. These RF transmitting and RF receiving channels form transmitting frequency-division-multiplexed signals and receiving frequency-division-multiplexed signals which are carried via a network carrier on a broadband cable network to and from a central switch, respectively.

The central switch in the system of the '234 patent permits each transmitting channel in the transmitting frequency-division-multiplexed signal to be coupled to a receiving channel in the receiving frequency-division-multiplexed signal, thereby permitting voice communication between subscriber locations of the coupled channels. For this purpose, the central switch includes a modulator/demodulator, a transmultiplexer and a digital switch. The modulator/demodulator, demodulates the transmitting frequency-division-multiplexed signal to remove the network carrier and feeds the resultant frequency-division-multiplexed signal to the transmultiplexer. The transmultiplexer, in turn, converts this signal into a transmitting time-division-multiplexed signal having digital transmitting channels corresponding to the RF transmitting channels.

The digital switch also establishes digital receiving channels which are assembled into a receiving time-division-multiplexed signal and fed to the transmultiplexer. The transmultiplexer then converts the receiving time-division-multiplexed signal into a receiving frequency-division-multiplexed signal which is fed to the modulator/demodulator. The latter modulates the signal onto the network carrier and the resultant signal is placed on the broadband cable network to be received at the subscriber locations.

While the system of the '234 patent can satisfactorily communicate voice information, the communication of data information, such as, for example, facsimile information, over the system is less satisfactory. This is due to phase distortion, sometimes known as quadrature distortion, which does not affect the perception of voice information, but does impair data information, particularly when it is transmitted using phase modulation.

Phase distortion occurs because the signals from the different subscriber locations experience different amounts of delay in propagating from each location to the central switch which is located at the so-called head end of the system. As above-noted, the modulator/demodulator at the central switch demodulates all RF transmitting signals to remove the network carrier. This is accomplished using a locally generated network carrier.

At each subscriber location, the frequency of the network carrier used is locked to the frequency source which establishes the locally generated network carrier. The phases of the network carrier at the subscriber location and locally generated network carrier necessarily differ. This phase difference between carriers produces phase distortion in the recovered RF transmitting channels. Thus, different RF transmitting channels are delayed by different amounts of time, making the recovered RF transmitting channels in general only a highly distorted replica of the original channels. This phenomenon is discussed, for example, in *Transmission Systems for Communications*, Bell Telephone Laboratories, 1970, pp. 104–107.

For typical CATV cable, at 500 Mhz, a phase change of 180° is associated with sources separated by 14 inches of cable. After demodulation, each component of a voice band signal from such a source will be shifted by 180°. The amount of phase distortion will vary with time because of drifting amplifier characteristics of the demodulator as well as temperature effects. For example, in an one mile long cable, a 15° C. change in temperature will produce a phase change of 180° at 500 MHz.

In the '234 patent, there is a mention of this phase distortion. The '234 patent states that the demodulator/ modulator at the central switch can be modified to correct this, but gives no specifics.

One known technique for providing correction of phase distortion in a frequency-division-multiplexed system is found in a system designed by Securicor PMR Systems Limited for mobile radio technology. The Securicor system uses a pilot tone and linear modulation to reduce phase discrepancies in voice band transmission. In particular, each voice band channel is split into high and low sub-bands and the high band shifted up in frequency to leave a gap into which a pilot tone is inserted.

The placement of the pilot tone in-band is necessary to accurately track the extremely large and rapid fluctuations in signal parameters caused by multi-path propagation in a mobile radio system. It has been reported to be superior to a system in which a pilot tone is placed just above each voice channel. Also, in the Securicor System, radio transmission is two-way point-to-point transmission. This requires implementation of the pilot tone arrangement at each point of the system.

The phase distortion correction in the Securicor System is thus quite complex and expensive. Implementation of this type of arrangement to correct phase distortion in the system of the '234 patent would, therefore, complicate the system and increase its cost.

It is therefore a primary object of the present invention to improve the system, method and apparatus of the '234 patent.

It is a further object of the present invention to reduce phase distortion in the system, method and apparatus of the '234 patent

SUMMARY OF THE INVENTION

In accordance with the principles of the present invention, the above and other objects are realized in a system of the type described in the '234 patent by further adapting each subscriber location in the system to generate a phase correction pilot tone. The phase correction pilot tones from the subscriber locations form one or more phase correction pilot tone channels which are separate from the RF transmitting channels. The RF transmitting channels and the phase correction pilot tone channels together define a transmitting frequency-division-multiplexed signal which is carried by the cable network to the central switch. The central switch is additionally adapted to include a phase correction means for recovering the phase correction pilot tones and for correcting the phase of each transmitting channel by using the pilot tone corresponding to that channel.

In one embodiment of the invention to be disclosed hereinafter, the phase correction means operates to digitally recover the phase correction pilot tones and to digitally provide phase correction to the digital transmitting channels corresponding to the RF transmitting channels. In a second embodiment, the phase correction pilot tones are digitally recovered and the phase correction is accomplished in the analog domain on the analog information carried in the transmitting channels. In a third embodiment, the phase correction pilot tones are recovered and the phase correction accomplished both in the analog domain.

BRIEF DESCRIPTION OF THE DRAWINGS

The above and other features and aspects of the present invention will become more apparent upon reading the following detailed description in conjunction with the accompanying drawings in which:

FIGS. 1A and 1B show a video/voice distribution system having phase correction in accordance with the principles of the present invention;

FIGS. 2A and 2B each show TDM voice channels used in the system of FIGS. 1A and 1B;

FIG. 3 shows the TDM voice channels of FIGS. 2A and 2B converted into a corresponding group of RF voice channels forming an RF voice channel sub-group;

FIG. 7A shows the phase correction pilot tones in reference to the TDM channels and FDM carriers;

DETAILED DESCRIPTION

Figure 1B:
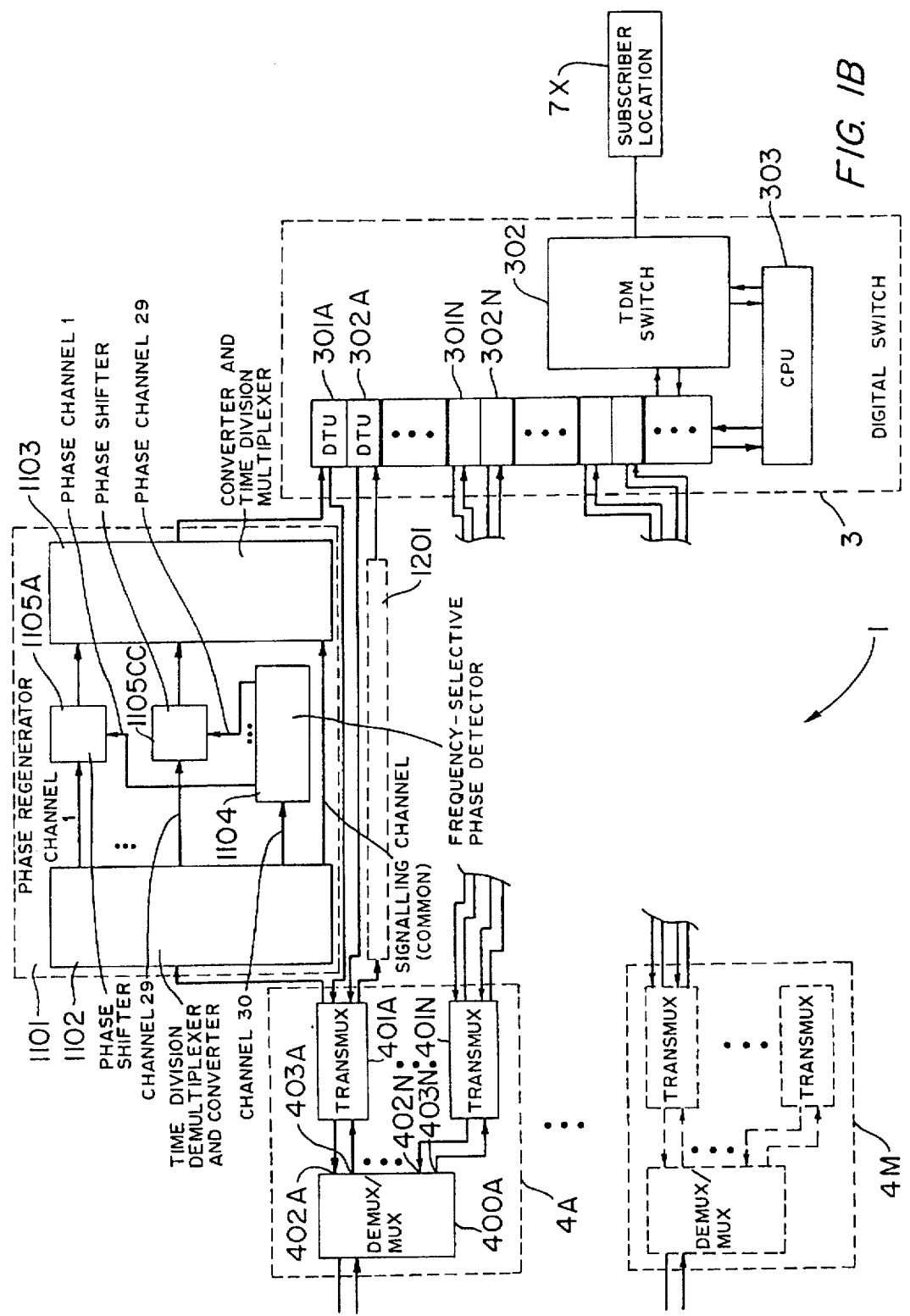

FIGS. 1A and 1B show a system 1 for distributing video information and also voice information in accordance with the principles of the present invention. As shown, the system 1 comprises a broadband coaxial network 2 which carries voice and video RF channels to voice and video equipment at the subscriber locations 7A to 7Y.

More particularly, the broadband coaxial network 2 comprises a vestigial sideband ("VSB") demodulator/modulator 206 which transmits RF video channels and transmits and receives RF voice channels over a primary coaxial system 200 having feeder coaxial branches 205. The feeder coaxial branches 205 connect to the primary coaxial branch 200 through bridging amplifiers 204. They also connect to the televisions 600A–600Y at the subscriber locations 7A–7Y via drops 211A.

As shown, the coaxial branch 200 and each of its feeder branches 205 comprises an incoming or upstream coaxial cable 201 and an outgoing or downstream coaxial cable 202. Line amplifiers 203 are connected to the cables 201 and 202 at preselected intervals, e.g., intervals of approximately one half mile, to compensate for signal attenuation.

In the present case, the broadband coaxial network 2 is of the type typically used to distribute video signals and, thus, has a broad bandwidth reaching as high as about 900 MHz. Furthermore, to permit concurrent distribution of multiple video signals on the network, the 900 MHz bandwidth of the network is divided into multiple, contiguous broadband RF channels, each individual broadband RF channel being of sufficient bandwidth to carry an independent video signal. To accommodate standard video signals, each broadband RF channel would thus be approximately 6 MHz wide.

The VSB demodulator/modulator 206 is located at the head end of the system and receives input video signals 208A–208X from video or TV sources 207A–207X. Each video source 207A–207X might be an antenna or a satellite. The VSB demodulator/modulator 206 modulates the input video signals onto a network carrier so that the resultant network signal contains contiguous or multiplexed broadband RF channels each carrying one of the video signals. This network signal is placed on the downstream coaxial cable 202 and subsequently received and decoded by the televisions 600A–600Y located at the subscriber locations 7A–7Y.

The system 1 is further adapted to permit the distribution of voice and data information among the subscriber locations 7A–7Y, as well as the aforementioned video information. This is accomplished in a manner which allows for a relatively large number of selectively connectable voice channels and, therefore, a relatively large number of subscriber locations capable of voice and data communication with one another.

More particularly, a number of broadband RF (i.e., 6 MHz) channels of the cable network 2 are used to carry voice and data information and associated signalling and control information among the subscriber locations. This is accomplished by adapting the system 1 for each subscriber location to establish associated RF transmitting and RF receiving voice channels and by allocating these voice channels to one or more of the broadband RF channels being used for voice and data transmission. It is further accomplished by adapting the system 1 to provide central switching and control of the RF transmitting and receiving voice channels such that each RF transmitting voice channel can be selectively switched or coupled to any one of the RF receiving voice channels. In this way, a voice path can be established between each subscriber location and any of the other subscriber locations in the system.

In the present illustrative embodiment, the RF transmitting and receiving voice channels of each subscriber location are established by a respective drop box (i.e., 5A, 5B . . . , 5Y) located at the particular subscriber location. The RF voice channels associated with the different subscriber locations, furthermore, are established by the respective drop boxes so that they form RF voice channel groups, each voice channel group being allocated to a different one of the RF broadband channels assigned to voice transmission and being carried by the network 2 carrier.

In the present case, since the network 2 includes an upstream cable 201 as well as a downstream cable 202, the RF transmitting voice channel and RF receiving voice channel of each subscriber location can occupy the same RF band. Also, because the RF receiving and RF transmitting voice channels of a given subscriber location can occupy the same RF band, they can also be carried in the same RF broadband channel of the cable network.

In the event the cable network 2 were modified to use only a single cable for upstream and downstream transmission, the RF transmitting and RF receiving voice channels would have to be offset from each other to prevent interference. In such situation, the channels would likely be required to occupy separate RF broadband channels of the cable network.

As above-indicated, the RF transmitting voice channel groups established by the subscriber locations are carried in the upstream cable 201 in the multiplexed broadband RF channels of the network 2. Similarly, the RF receiving voice channel groups are carried via the downstream cable 202 again in the multiplexed RF broadband channels of the network.

As also above indicated, the system 1 is adapted to provide centralized, selective switching or coupling of the voice information and associated signalling information in each RF transmitting channel to any one of the RF receiving channels. In the present illustrative example, this is effected by a digital switch 3, which is shown as including a TDM switch 302 and a CPU 309, and by a time/frequency converter assembly 4. The converter assembly 4 includes individual time/frequency converter units 4A to 4M, each assigned to a particular RF broadband channel carrying a frequency-division-multiplexed (FDM) RF voice channel group.

More particularly, after demodulation of the upstream network signal to produce the individual RF broadband channels, the modulator/demodulator 206 passes the broadband channels to respective output ports 210A to 210M connected to converter units 4A–4M, respectively. Each converter unit then converts the RF transmitting voice channels in its received RF broadband channel into corresponding digital voice channels and one or more control channels organized into one or more TDM signals for processing by the digital switch 3.

As a result of its processing, the digital switch 3 places voice, data and signalling information into digital voice channels and one or more control channels which correspond to the receiving RF voice channels. The switch 3 organizes these digital voice channels and control channels also into one or more TDM signals and conveys these signals to their associated converters 4A to 4M, i.e., to the respective converters assigned to the RF broadband channel carrying the corresponding RF voice channels. Each converter then converts its received digital channels into a corresponding FDM RF receiving voice channel group. Each receiving voice channel group is then delivered to the modulator/demodulator 206 where it is placed in the corresponding broadband RF channel and modulated onto the network carrier for subsequent delivery to the subscriber locations via the downstream cable 202.

In the present illustrative case of the use of TDM switch 302 in the digital switch 3, the digital voice channels transmitted between the switch and each of the converters 4A to 4M are contained in time slots of the generated TDM signals. Each time division multiplexed signal contains a number of digital voice channels, a synchronization channel and a control channel for control and signalling information.

The TDM signals are communicated to and from the TDM switch 302 by digital trunk units (DTUs) included in the switch 3. A group of these units is associated with each converter unit 4A to 4M (e.g., DTU's 301A to 301N and 302A to 302N are associated with converter 4A). Each converter unit 4A to 4M, in turn, comprises a number of time/frequency converters or transmultiplexers (e.g., TRANSMUXES 401A to 401N) each of which transmits and receives the TDM signals from a pair of DTUs (e.g., DTUs 301A and 302A are paired with TRANSMUX 401A).

Each of the TRANSMUXES in the units 4A to 4M converts its received digital voice channels and its received synchronization and control channels into a corresponding FDM sub-group of RF receiving voice channels. Each FDM channel sub-group is then combined by a demultiplexer/ multiplexer (DEMUX/MUX) unit in the respective converter (e.g., DEMUX/MUX 400A in converter 4A) with other channel sub-groups to generate an FDM RF channel group which is delivered to a respective receive port 209A to 209M on the modulator/demodulator 206.

In the other direction, the reverse process occurs in each of the converter units 4A to 4M. Thus, the FDM RF transmitting voice channel group received at each converter 4A to 4M is separated by the DEMUX/MUX into FDM sub-groups of RF transmit voice channels. These FDM sub-groups are then fed to respective TRANSMUXES, where they are converted to TDM transmit signals having corresponding digital transmit voice channels and associated synchronization and control channels. These TDM signals are delivered to corresponding DTUs and processing by the TDM switch 302.

FIGS. 2A and 2B show the format of the TDM signals transmitted between the DTUs 301A and 302A and the TRANSMUX 401A of the converter unit 4A. Each signal is shown as carrying 30 digital voice channels (T1–T15 and T17–T32), one synchronization channel (T0) and one control channel (T16), the two signals together accounting for 60 voice channels.

FIG. 3 illustrates the FDM RF receiving voice channel sub-group signal transmitted between the TRANSMUX 401A and DEMUX/MUX 400A of the unit 4A. This signal results from frequency conversion of the TDM signals of FIGS. 2A and 2B. As shown, each digital voice channel is converted into a 4 KHz wide RF voice channel, resulting in 60 RF voice channels, each containing the voice, control and synchronization information pertaining to its associated digital channels.

Figure 4:
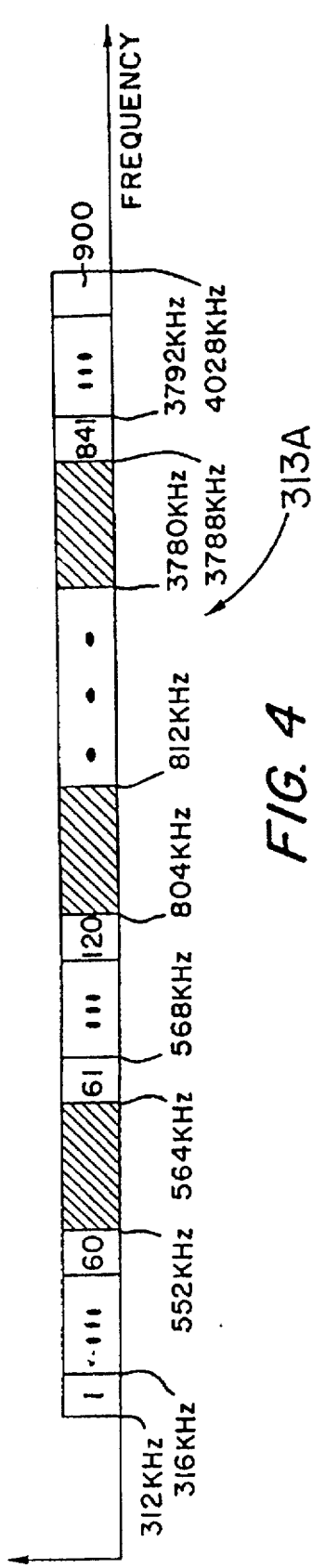
FIG. 4 shows additional RF voice channel sub-groups multiplexed with the voice channel sub-group of FIG. 3 to form a broadband RF voice channel group.

FIG. 4 illustrates the resultant FDM RF receiving voice channel group signal delivered by the DEMUX/MUX 400 as a result of the applied FDM RF sub-groups from the TRANSMUXES 401A to 401N. The illustration assumes 15 TRANSMUXES in the converter 4A, resulting in (15×60) or 900 RF receive voice channels over a frequency band of 312 KHz to 4028 Khz.

Figure 5:
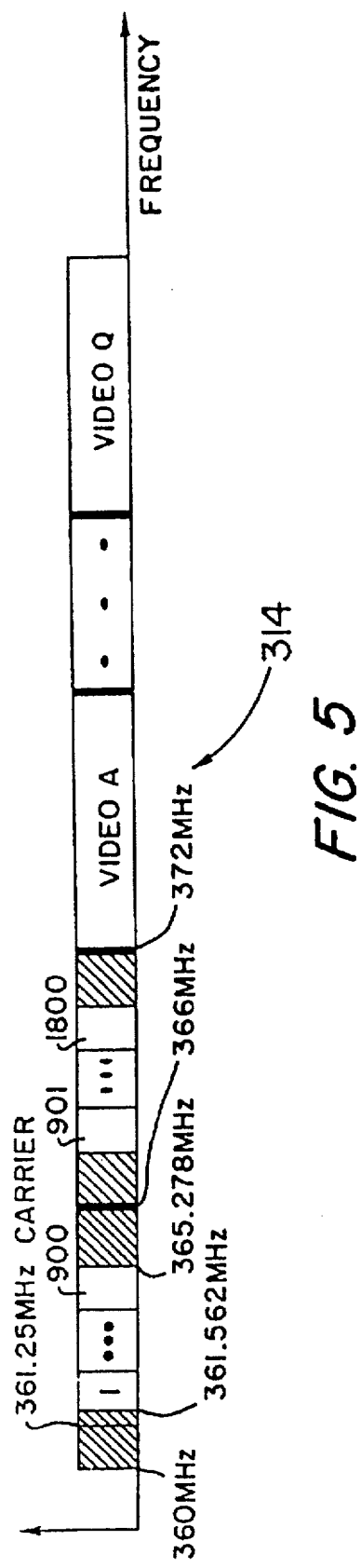
FIG. 5 shows the broadband RF voice channel group of FIG. 4 modulated onto an RF cable network carrier with other contiguous broadband RF voice channel groups and broadband RF video channels.

Finally, FIG. 5 shows the downstream network signal from the modulator/demodulator 206. As shown, the FDM RF receiving voice channel group of FIG. 4 has been modulated onto the network carrier (361.25 MHz) in a first 6 MHz RF broadband channel. Also shown is another FDM RF receiving voice channel group containing RF voice channels 901 to 1800 modulated onto the network carrier in a second 6 MHz channel contiguous with the first channel. As mentioned earlier, the downstream signal also contains video channels, (VIDEO A and VIDEO B), also modulated onto the carrier in further multiplexed 6 MHz broadband channels.

As above-indicated, the RF transmitting and receiving voice channels are coupled to and from their corresponding subscriber locations via respective dropboxes 5A to 5Y. Referring to dropbox 5A for illustrative purposes, the dropbox comprises a VSB modulator/demodulator or modem 502A, a single channel multiplexer 501A, and an interface unit 500A. The VSB modem 502A has a receiving port 504A which connects to the downstream cable 202 at drop 211A and a transmitting port 503A which connects to the upstream cable 201 at drop 212A.

The VSB modem 502A is configured to demodulate or extract from the downstream network signal the broadband RF channel (i.e., 6 MHz channel) containing the RF receiving voice channel associated with the subscriber location 7A. Thus, assuming the subscriber location 7A corresponds to the RF receiving voice channel 1 in the network signal of FIG. 5A, the modem 502A will extract from this signal the first broadband RF channel (i.e, the 360–366 MHz channel), since it contains the RF receiving voice channel 1. Conversely, an RF transmitting voice channel i sent by the single channel multiplexer 501A to the VSB modem 502A will be modulated by the VSB modem 502A into the first broadband RF channel and then transmitted from port 503A of the modem to the upstream cable 201.

The first broadband RF voice channel (366—366 MHz) once extracted by the modem 502A, is then conveyed to the single channel multiplexer 501A which is configured to demodulate the RF channel group to obtain the associated RF receiving voice channel (channel 1) and return this channel to base band to recover the resultant 4 KHz baseband receiving channel. This channel is then processed to extract voice information (i.e., band limited to 300–3400 Hz) and also processed to extract any out-of-band signalling information. The voice information is then passed via output port 507A to an input port 505A of an interface unit 500A. The signalling information is, in turn, passed via another output port Mm to a further input port Ei of the interface unit.

In the transmit direction, the single channel multiplexer 501A receives at its input port 508A from the output port 506A of the interface unit 500A, baseband voice information. The multiplexer also receives signalling information at its Em port from the Mi port of the interface unit. This voice and signalling information is, in turn, modulated by the multiplexer into the RF transmitting voice channel (i.e., channel 1) and sent by the multiplexer to the modem 502A where it is placed in the first RF broadband channel of the network 2, as above-described.

The interface unit 500A provides a standard tip T and ring R connection to a phone 601A located at subscriber location 7A. The band-limited receiving voice channel information at the input terminal 505A of the interface unit 500A is provided to these connections so that voice information becomes available at the phone 601A. Further, transmitted voice information received from the phone 601A on the tip T and ring R connections is transferred by the output terminal 506A of the interface unit 500A to the single channel multiplexer for inclusion in the transmitting voice channel being transmitted at the subscriber location.

The interface unit 500A also develops signalling information based upon the signalling information received at its Ei port and the state of the phone 601A. This signalling information is passed from the Mi port of the interface to the Em port of the modem where it is included in the RF transmitting voice channel developed by the modem, as above-described.

It is desirable to avoid frequency shifts in the modulating and demodulating process performed at the drop boxes 5A to 5Y. To achieve synchronization, the system 1 is further adapted to provide a synchronizing pilot signal at the drop boxes. This signal is supplied from the reference source used to generate the RF channel group signals at the DEMUX/MUX 400A.

Figure 6:
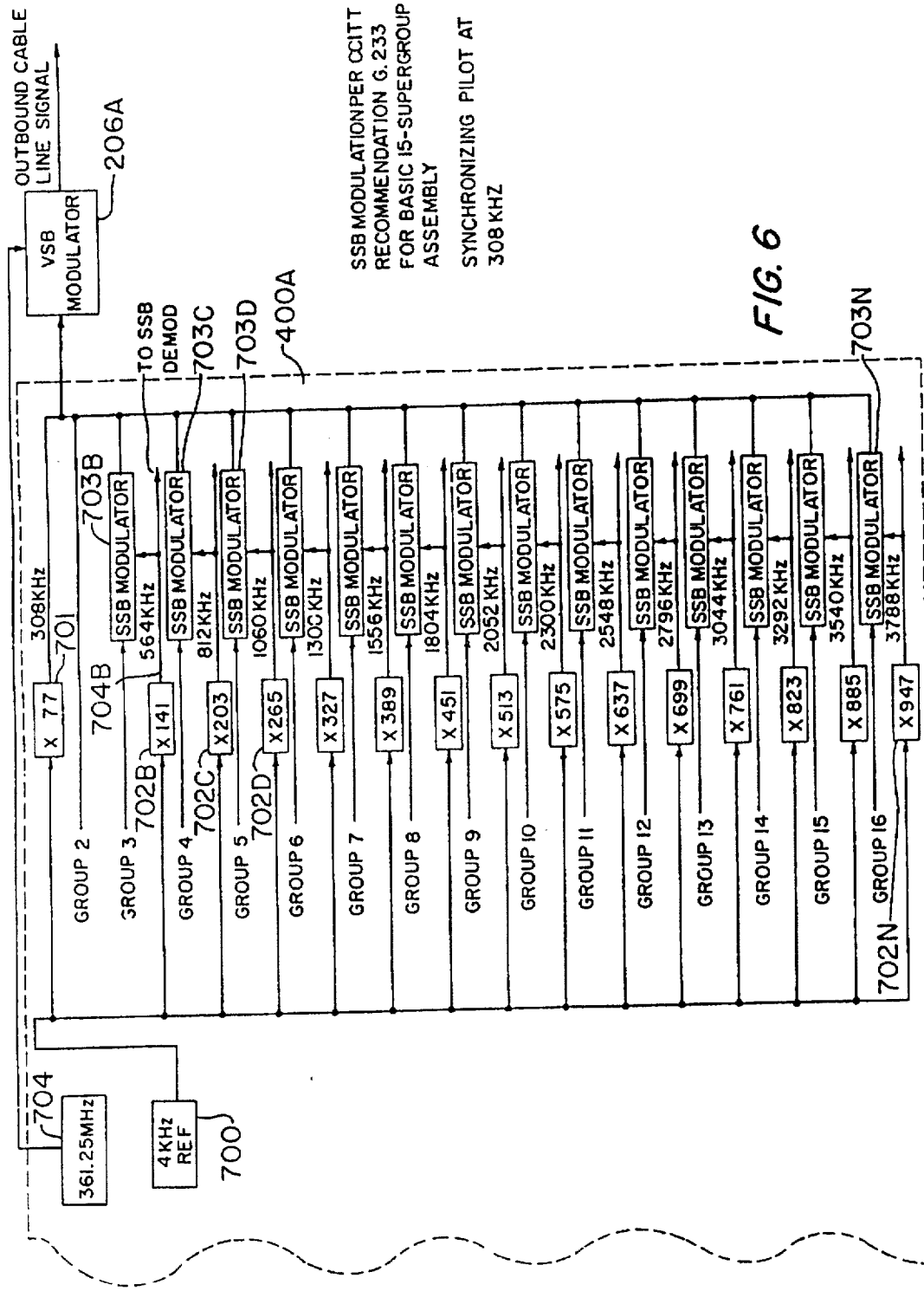
FIG. 6 shows schematically equipment for realizing the broadband RF voice channel group of FIG. 4.

FIG. 6 shows in greater detail the multiplexing section of the DEMUX/MUX 400A used to generate the RF channel group of FIG. 5. A 4 Khz reference frequency source 700 serves as the primary source for generating both pilot signal and reference frequencies for multiplexing the RF channel sub-groups (i.e., groups 2–16). More particularly, the reference frequency is applied to a pilot frequency multiplier 701 which multiplies the frequency by 77 to develop a 308 KHz pilot signal. This signal is modulated onto the network carrier provided by a carrier source 704 to the VSB modulator/demodulator 206. The pilot signal is then recovered at the drop boxes and used to develop reference frequencies for demodulation and modulation as described below.

As is also shown in FIG. 6, the 4 Khz reference frequency is also applied to suitable multipliers 702B–702N whose outputs are applied as reference frequencies to the single sideband modulators 703B–703N. The latter, in turn, modulate the RF frequency sub-groups to develop the RF channel group in FIG. 4. This channel group is also applied to modulator/demodulator 206 to generate the first broadband RF channel of the signal in FIG. 5.

Figure 7:
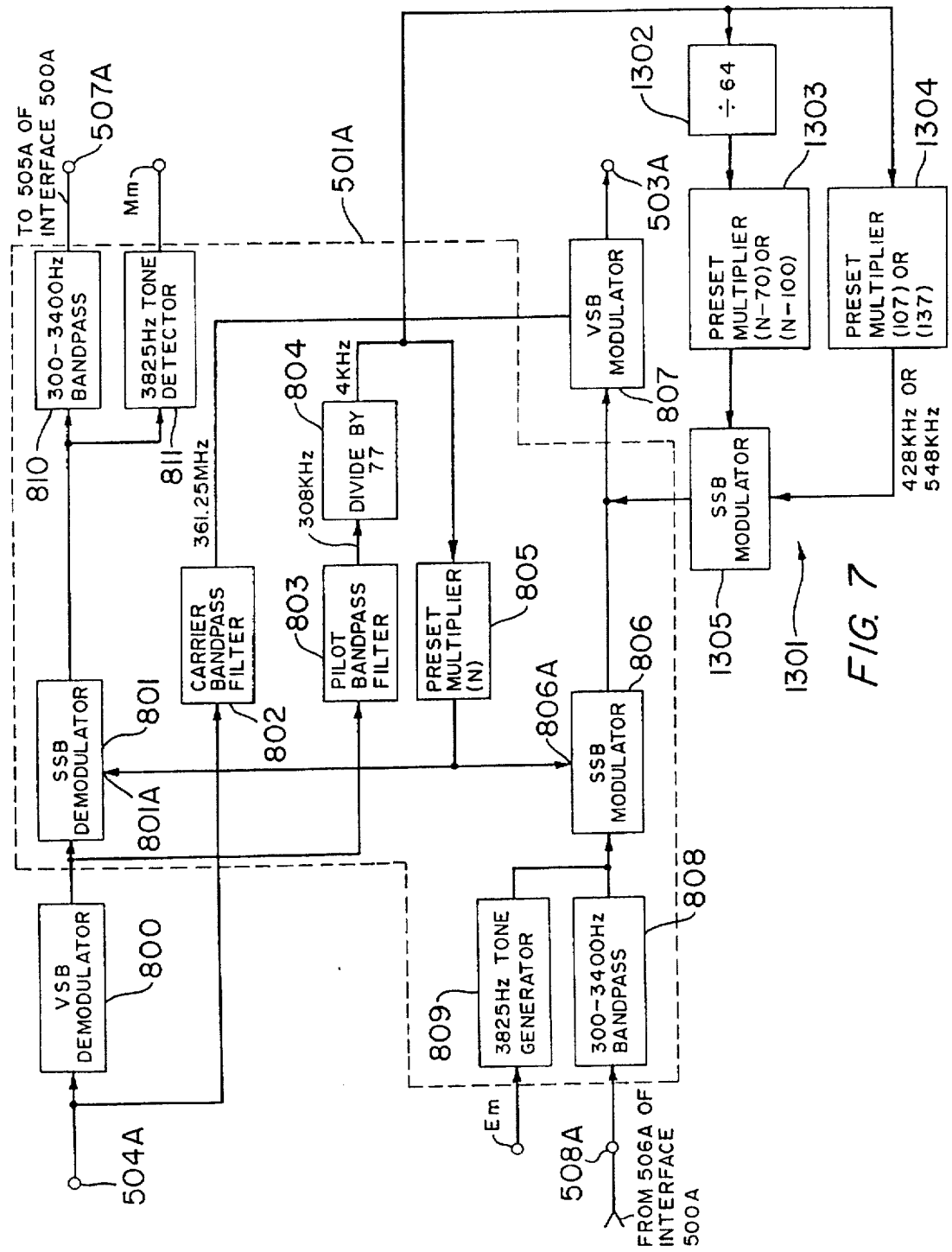
FIG. 7 shows the details of the modulation/demodulation apparatus used at the subscriber locations of the system of FIGS. 1A and 1B.

FIG. 7 shows in greater detail the VSB modem 502A and the single channel multiplexer 501A shown in FIG. 1 modified to utilize the pilot signal generated at the DEMUX/MUX for synchronization. The network signal received at the VSB modem input port 504A is supplied to a carrier bandpass filter 802 and, after passage to VSB demodulator 800, to a pilot bandpass filter 803. The network carrier bandpass filter 802 recovers the 361.25 MHz network carrier, while the pilot bandpass filter 803 recovers the 308 Khz pilot signal. The recovered signals are then used in the modulator and demodulator processing to ensure synchronization.

More particularly, the recovered network carrier is applied to the VSB modulator 807 of the VSB MODEM 502, thereby ensuring that modulation occurs at the appropriate frequency. The 308 KHz pilot signal, in turn, is applied to a divide by 77 frequency divider 804 to recover the 4 Khz reference signal. This signal is then applied to a preset multiplier 805 to derive the reference frequency for the associated RF transmit and receive voice channels of the subscriber location (i.e., the frequency 312 Khz for the channel 1 of the location 7A). This reference frequency is then applied to the SSB Modulator 806 and the SSB Demodulator 801A of the multiplexer to provide the RF transmit voice channel and recover the baseband voice channel, respectively.

The multiplexer 501A of FIG. 7 also contains bandpass filters 808 and 810 which are used to band-limit the recovered baseband voice channel and the voice channel being transmitted, respectively. Also, the multiplexer is provided with an out-of-band tone generator 809 and an out-of-band tone detector 811. These components generate and detect a 3825 Hz tone which is used as signalling information in the RF transmit and receive voice channels of the subscriber locations.

More particularly, 3825 Hz signalling tones are used to provide an indication of on and off hook conditions and to generate ringing signals. In the present case, each interface unit provides simple logic changes to indicate the on and off hook conditions of its respective phone. These conditions are used to instruct tone generation by the respective multiplexer. Also, the switch 3 uses 3825 Hz tones to request connection to a subscriber location. These interactions will become apparent in the description of the operation of the system I set forth hereinbelow.

Figure 7B:
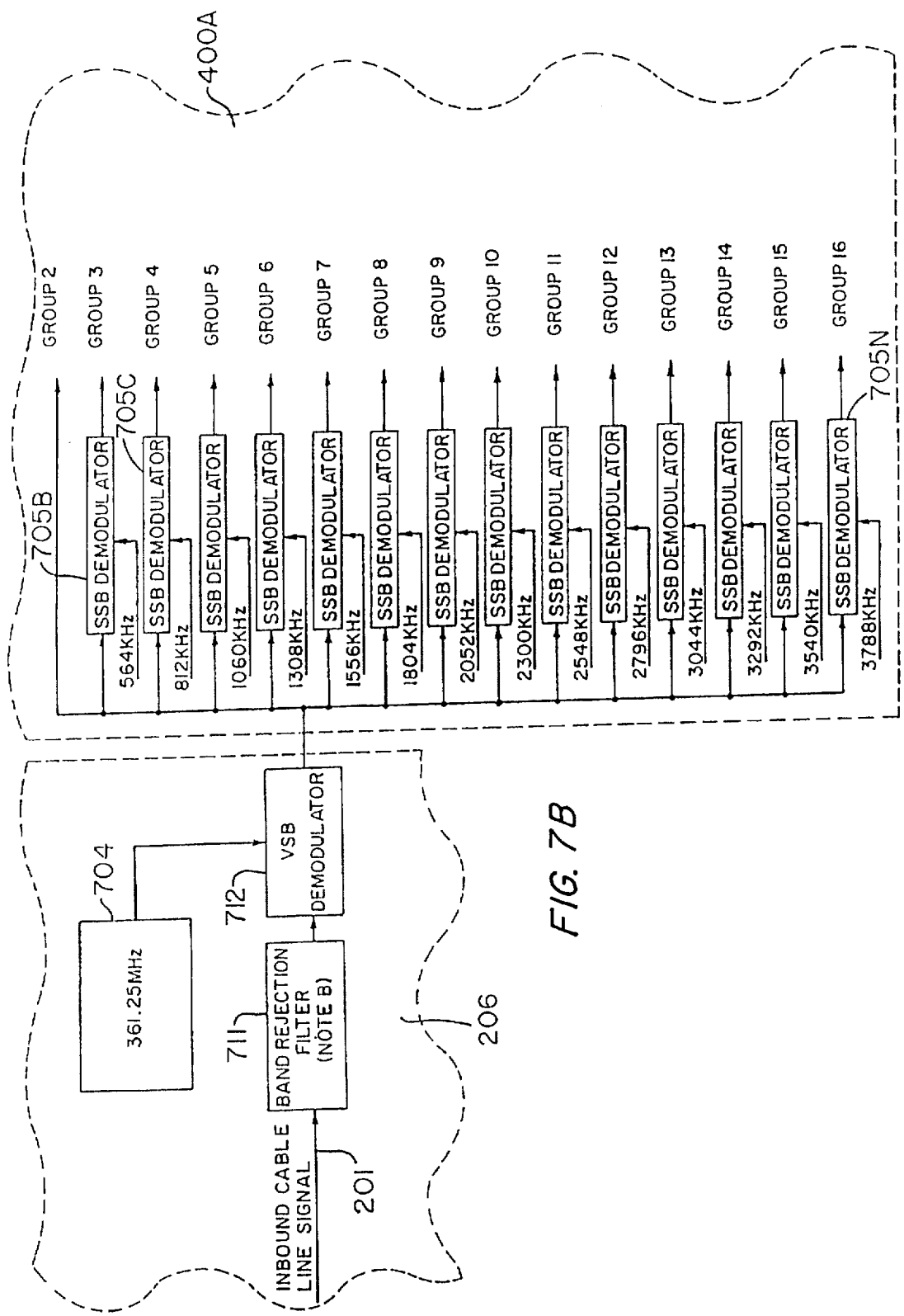
FIG. 7B shows the demodulation portion of the VSB modulator/demodulator of the cable network modified to ensure use of a network carrier having a stable phase.

FIG. 7B shows the demodulation portion of the modulator/demodulator 206. As can be seen, the upstream signal into the demodulator is first passed through a band rejection filter 711 which is adapted to reject signals at the network carrier frequency (i.e., 361.25 MHz in the present example). The filtered signal is then passed into a VSB demodulator 712 which is now supplied with the network carrier from the carrier source 704 used to supply the VSB modulator 206A (see, FIG. 6). The demodulated signal is then applied to the demultiplexer section of the appropriate DEMUX/MUX to recover the RF channel sub-groups.

In FIG. 7B, the portion of the DEMUX/MUX 400A for recovering the channel sub-groups 2–16 shown in FIG. 6 is also illustrated. As shown, SSB demodulators 705B–705N supplied with appropriate demodulation frequencies recover the respective channel groups 2–16.

Figure 8:
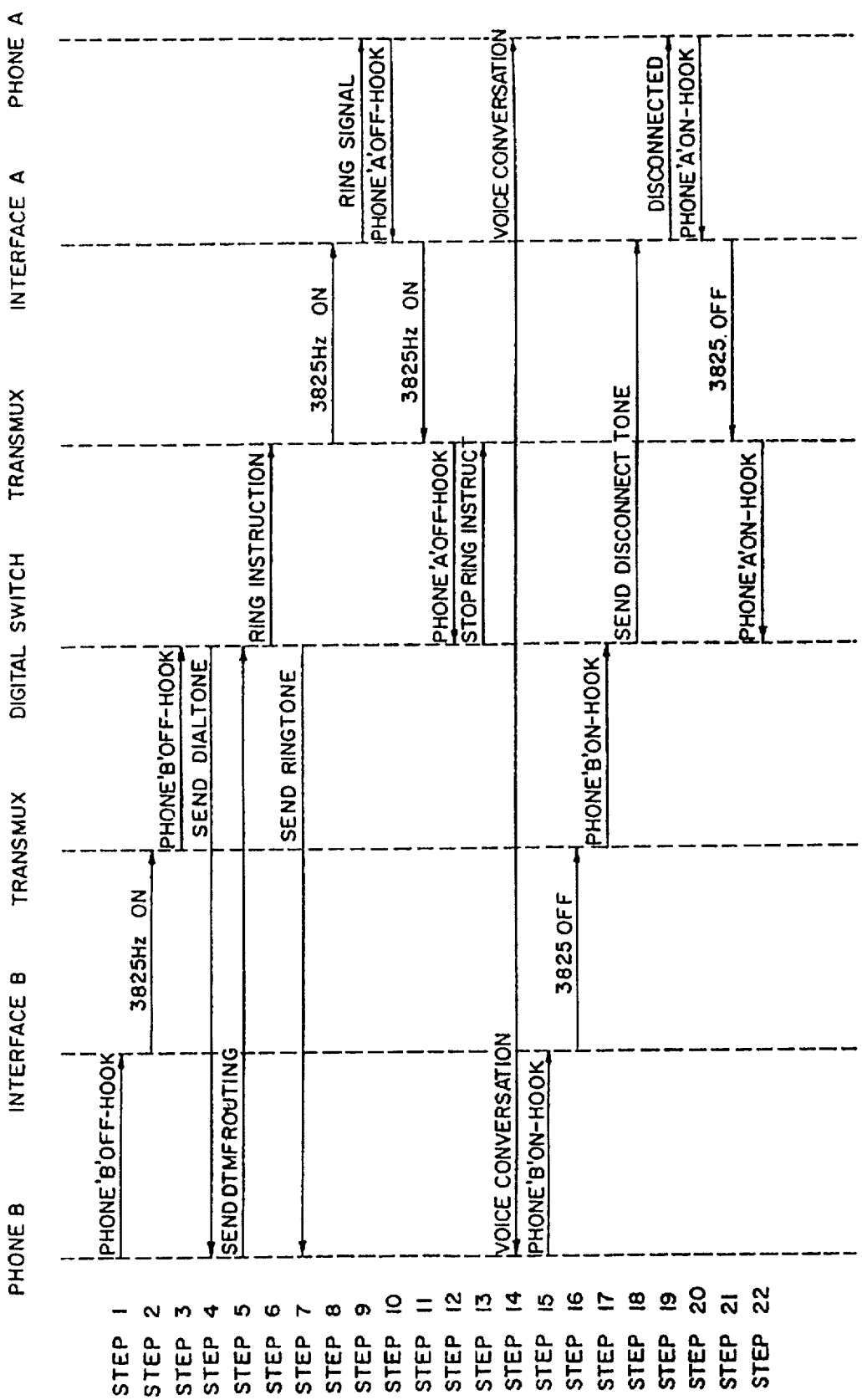
FIG. 8 shows a timing chart for operation of the system of FIGS. 1A and 1B.

FIG. 8 shows the sequence of events when placing a call from the phone 601B at the location 7B to the phone 601A at the location 7A. In the description, it will be assumed that the location 7A uses transmitting and receiving RF voice channel 1 and that the location 7B uses the transmitting and receiving RF voice channel 2, shown in FIGS. 3–5.

Step 1: --PHONE 601B OFF-HOOK--; When phone 601B goes off-hook, the interface 500B detects a change in the state of the associated tip T and ring R lines.

Step 2: --3825 Hz ON--; The interface 500B transfers a logic signal from its Mi port to the Em port of the single channel multiplexer 501B instructing it to turn on the 3825 Hz tone generator. This causes a 3825 Hz tone to be continuously transmitted in the associated RF transmitting voice channel 2 of the network signal of the modem 502B.

Step 3: --PHONE 601B OFF-HOOK--; The RF transmitting voice channel 2 containing the 3825 Hz tone is passed by the modulator/demodulator 206 and DEMUX/MUX 400A to the TRANSMUX 401A assigned to transmitting channel 2. The TRANSMUX detects the presence of the 3825 Hz tone and transmits an off hook signal to the TDM switch 302 via DTU 301A. This signal is carried in the control channel of the TDM signal carrying the transmit voice channel 2 and indicates to the switch that the channel 2 is off-hook.

Step 4: --SEND DIALTONE to PHONE 601B--; The TDM switch 302 places a dial tone signal in the control channel of the TDM signal carrying the receiving voice channel 2 and it is delivered by the DTU 301A to the TRANSMUX 401A. The latter places a dial tone in the RF receiving voice channel 2 which passes via the downstream network signal to the corresponding drop box 5B. This tone is extracted by bandpass filter 810 in the multiplexer 501B and passed through the interface circuit 500B to the T and R lines of phone 601B.

In the remaining discussion of the operating steps of the system 1, it will be understood that transmission between the drops boxes 5A and 5B and the TDM switch 3 occurs over the associated drop box components, the associated cables, the modulator/demodulator 206, and the associated DEMUX/MUX, TRANSMUX and DTU, although these components may not be specifically mentioned in the interests of brevity.

Step 5: --SEND DTMF PHONE NUMBER--; Upon receiving dial tone, the DTMF phone number of phone 601A is transmitted from phone 601B to the TDM switch 302 over the RF and corresponding digital voice channel 2. The digital switch looks up in memory the DTMF phone number dialed and determines that the phone being called is on voice channel 1, i.e., is the phone 601A.

Step 6: --RING INSTRUCTION--; The TDM switch 302 sends a message in the control channel of the TDM signal containing the voice channel 1 instructing the TRANSMUX 401A to turn on a 3825 Hz tone in RF receive voice channel 1.

Step 7: --SEND RING TONE TO ORIGINATOR--; The TDM switch 302 then sends a ringing tone to phone 601B voice channel 2.

Step 8: --3825 Hz ON--. The TRANSMUX 401A turns on the 3825 Hz signal for the receiving voice channel 1.

Step 9: --RING SIGNAL--. The single channel multiplexer 501A associated with receiving voice channel 1 and phone 601 detects the presence of the 3825 Hz signal and passes a logic signal from its Mm port to the Ei port of interface 500A. The interface 500A then generates a ring signal on the tip T and ring R lines of phone 501A.

Step 10: --PHONE A OFF-HOOK--; When phone 501A is answered there is a detectable change in the state of the associated tip T and ring R lines.

Step 11: --3825 Hz ON--; The interface 500A detects the change in state via a signal to its Em port from the Mi port of the interface. It then instructs the single channel multiplexer 501A to turn on its tone generator to initiate a continuous 3825 Hz tone in transmitting RF voice channel 1 and ceases generating the ringing signal on the tip R and ring R lines of phone 601A.

Step 12 --PHONE A OFF-HOOK--; The TRANSMUX associated with transmitting RF voice channel 1 detects the presence of the 3825 Hz tone in the RF voice channel 1 and transmits an off-hook signal to the TDM switch 302 via the control channel of the TDM signal containing the transmitting voice channel 1.

Step 13 --STOP RING INSTRUCTION--; The TDM switch stops the ringing tone being sent over the RF receiving voice channel 2.

Step 14: --VOICE CONVERSATION--; The TDM switch at this time has now established a virtual talk path between the calling phone 601B and the called phone 601A over the RF transmit and receive voice channels 2 and the RF transmit and receive voice channels 1. Bidirectional conversation can now occur.

Step 15: --PHONE 601B ON-HOOK--; When phone 601B goes on-hook (i.e., hangs up), the interface 500B detects a change in the state of the associated tip T and ring R line.

Step 16: --3825 Hz OFF--; The interface 500B via its Mi port instructs the single channel multiplexer 501B via its Em port to turn off the 3825 Hz tone generator.

Step 17: --PHONE 601B ON-HOOK--; The TRANSMUX 901A assigned to RF voice channel 2 detects the absence of the 3825 Hz tone and transmits an on hook signal to the TDM switch 302 in the control channel of the TDM signal containing the transmit voice channel 2.

Step 18: --SEND DISCONNECT TONE--; The TDM switch 302 then terminates the virtual path established between voice channel 2 and the voice channel 1, i.e., phones 601B and 601A. The TDM switch then transmits a message over the TDM signal containing the receiving voice channel 1 to the TRANSMUX instructing the TRANSMUX to turn off the 3825 tone in the voice channel 1.

Step 19: --DISCONNECTED--; The interface 500A detects the absence of a 3825 Hz tone in receiving voice channel 1 and sends dial tone to phone 601A.

Step 20: --PHONE ON-HOOK-- When phone 601A is place on-hook there is a detectable change on its associated tip T and ring R lines.

Step 21: --3825 Hz OFF--; The interface 500A detects the change in state and instructs via its Mi port the single channel multiplexer 501A at its Em port to cease transmitting the 3825 Hz tone in RF voice channel 1.

Step 22 --PHONE 601A ON-HOOK--; The TRANSMUX associated with RF voice channel i detects the absence of the 3825 Hz tone in voice channel 1 and transmits an on-hook signal to the TDM switch 302.

The above described process is repeated for subsequent phone conversations.

Figure 9:
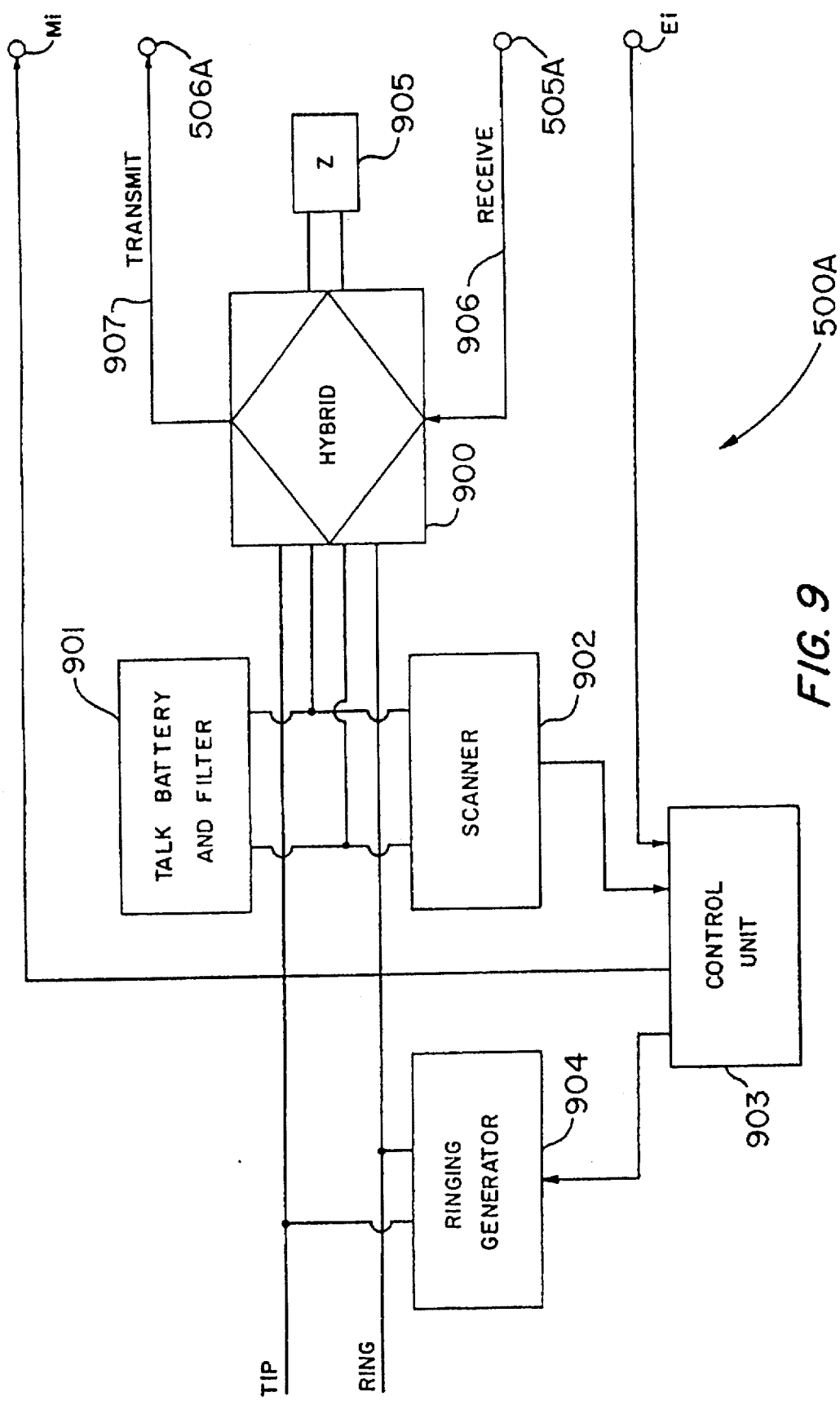
FIG. 9 shows the details of the interface unit used at the subscriber locations of the system of FIGS. 1A and 1B.

FIG. 9 shows in greater detail an example of the interface unit 500A. Similar units can be used for the other interface units 500B-500Y. As shown, a hybrid circuit 900, having a balancing impedance Z, depicted at 905, connects to the TIP and RING lines. A receive line 906 and a transmit line 907 from the input terminal 505A and the output terminal 506A, respectively, connect to the hybrid circuit 900. A scanner 902 is also connected to the hybrid 900 and detects whether the tip T and ring R lines indicate an on-hook or off-hook condition. A ringing generator 904 connects to the TIP and RING lines and generates a ringing signal when directed to do so by control unit 903.

A control unit 903 receives signals from the scanner 902 and the Ei input terminal. Further the control unit supplies control signals to the ringing generator 904 and the Mi output terminal. The various states of ports Ei, Mi, the scanner 902 and the ring generator 904 as controlled by the control unit 903 are given below. These states follow from the above discussion of the operation of the system 1. States 1–3 relate to a calling phone and states 4–6 relate to a called phone. An off-hook status indicates an active state and on one-hook status an inactive state.

Figure 10:
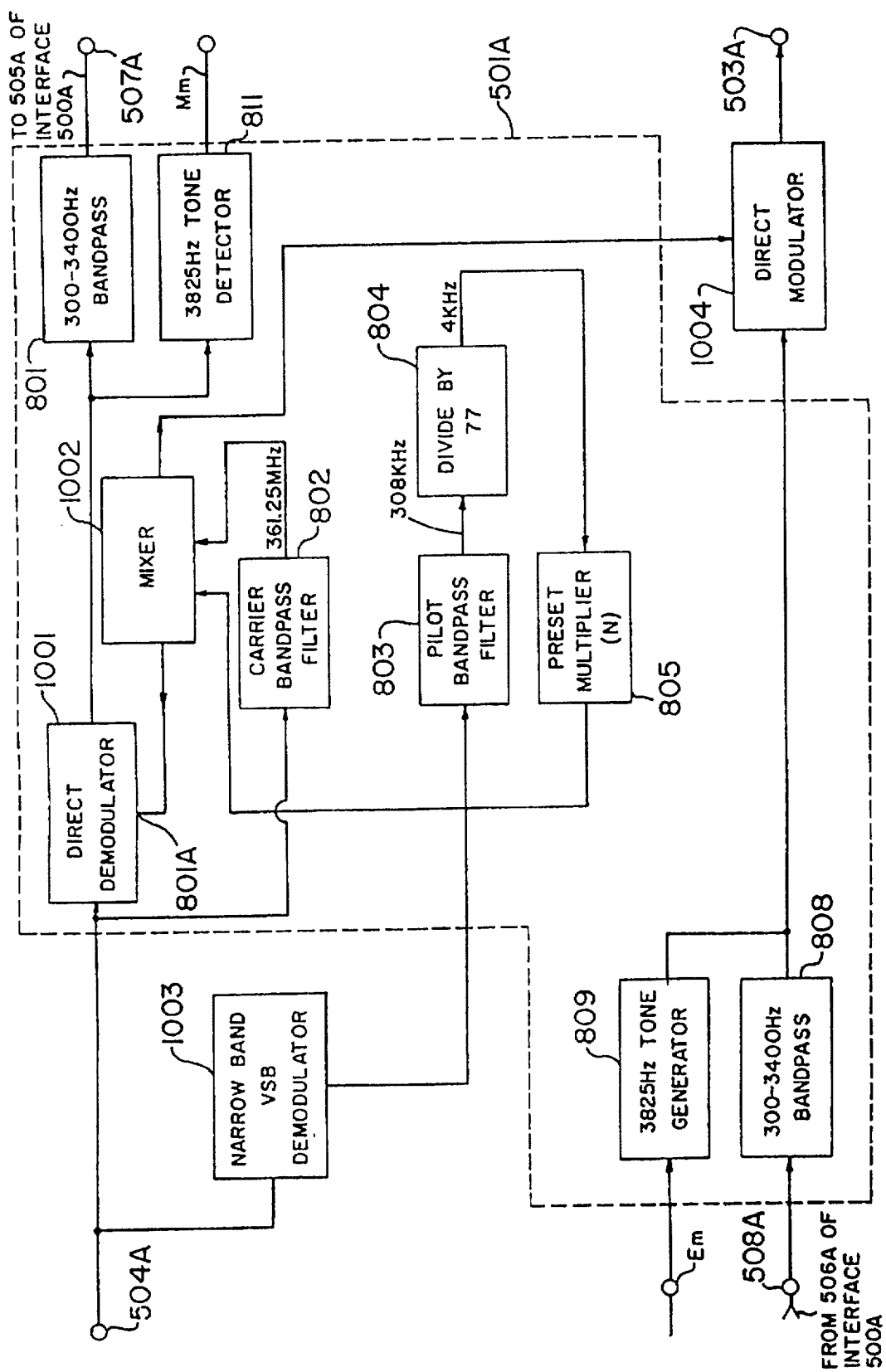
FIG. 10 illustrates a modification of the modulation/demodulation apparatus of FIG. 7.

State 1: When a phone is idle
Scanner=on hook
Ei=on hook
Mi=on hook
Ring Gen.=no ring
Switch 302=not connected
State 2: Initiating a call
Scanner=off hook
Ei=on hook
Mi=off hook
Ring Gen.=no ring
Switch 302=dial tone, busy tone, ringing tone
State 3: Connection with destination
Scanner=off hook
Ei=off hook
Mi=off hook
Ring Gen.=no ring
Switch 302=connected
State 4: incoming call
Scanner=on hook
Ei=off hook
Mi=on hook
Ring Gen.=ring
Switch 302=not connected
State 5: phone answered
Scanner=off hook
Ei=off hook
Mi=off hook
Ring Gen.=no ring
Switch 302=connected
State 6: Calling phone disconnects
Scanner=off hook
Ei=on hook
Mi=off hook
Ring Gen.=no ring Switch 302=not connected FIG. 10 illustrates a modification of the VSB modem and single channel multiplexer shown in FIG. 7. In the case of FIG. 10, the RF transmitting and receiving channels are developed by direct modulation and demodulation, respectively. This is realized, in the case of the RF transmitting channel, by modulating the voice and signalling information directly at the frequency desired for the transmitting channel in the associated RF broadband channel. In the case of the RF receiving channel, it is realized by demodulating the received signal directly at the frequency of the RF receiving channel in its associated RF broadband channel. Furthermore, the pilot signal is recovered from the received signal in the FIG. 10 arrangement by using a VSB demodulator whose frequency band of operation need only be sufficiently wide to reach the pilot frequency as modulated onto the network carrier.

In FIG. 10, those components which are the same as those in FIG. 7 have been numbered the same. As shown, the downstream signal received at port 504A is applied to direct demodulator 1001 which directly recovers the RF receiving channel by demodulation at the specific carrier frequency of the channel in the downstream signal. For example, in the case of the RF receiving channel 1 in FIG. 5, the demodulation frequency applied to demodulator 1001 to recover the channel would be at 361.562 MHz. The latter frequency is generated by a mixer 1002 which multiplies the recovered network carrier signal (361.25 MHz) by the output signal (for channel 1 this output is at 312 KHz) of the preset multiplier 805.

As in FIG. 7, the preset multiplier 805 develops its output signal by multiplying the 4 KHz reference signal by the factor N. The 4 KHz reference is obtained at the output of the divide by 77 circuit 804 which divides the 308 KHz synchronization pilot signal developed at the output of pilot bandpass filter 803.

The 308 KHz synchronization signal is generated, in this case, from the downstream signal by first passing it through a narrow bandpass VSB demodulator 1003. The pass band of this demodulator need only be sufficient to extend to the 308 KHz synchronization signal as modulated on the network carrier (i.e., extend to 361.588 MHz). The output of the demodulator is then fed to bandpass filter 803 to recover the actual 308 KHz signal.

The output of mixer 1002 is also applied to direct modulator 1004. This results in the input voice and signalling signals to the modulator being directly modulated at frequency (in the case of channel 1 at 361.562 MHz) which places the RF transmitting channel at the desired frequency position in the upstream signal.

It should noted that the TDM switch 302, the TDUs, TRANSMUXES and the DEMUX/MUX of the digital switch 3 and converter 4 can be provided by suitably modified conventionally available components operating on a usual CCITT standard used for TDM transmission. A particular example of a TDM switch 3 might be a Harris #20—20 digital switch equipped with a Harris #2MB DTU operating at CCITT recommendation G.700. An example of a suitable TRANSMUX might be the DSC-Granger TM 7800-M1 TRANSMUX. A suitable DEMUX/MUX would be one operating in accordance with CCITT recommendation G.233.

As can be appreciated, with the system 1, it is now possible to provide voice communication, via the cable network 2 and the centralized switch 3, between a large number of subscriber locations. For the present illustrative case, 900 voice channels corresponding to 900 subscriber locations have been provided in each 6 MHz RF broadband channel of the cable network, as compared to only 28 channels and locations for the prior art systems. Moreover, the 900 channels in each 6 MHz broadband channel can be connected to each other and any of the channels in the other 6 MHz channels. Accordingly, by suitable selection of the number of broadband channels of the network 2 allocated to voice transmission, 10,000 or more selectively interconnectable voice channels can be provided.

It should be noted that the TDM switch 302 can itself be a switch in a conventional telephone system which is adapted to couple with the cable network as above-described. In such case, subscriber locations (e.g., location 7X) connected to the switch, but not served by the cable network, can also be connected through the switch and the cable network to the subscriber locations served by the network. Additionally, subscriber locations connected through other switches and trunks to the TDM switch can be similarly connected to the subscriber locations in the cable network.

In the system of FIGS. 1A and 1B, the VSB modems 502A–502Y used at the drop boxes 5A–5Y cause the RF transmitting channels carried by the network carrier to be vestigial sideband signals. The composite upstream signal on the line 201 thus comprises a number of vestigial sideband signals each carrying a part of the network carrier. These signals are received at the VSB modulator/demodulator 206 which, in accordance with conventional vestigial sideband principles, demodulates the signals by regenerating the network carrier from the received signals and by using the regenerated network carrier to demodulate the signals. This extracts the RF broadband channels containing the RF transmitting voice channel groups. Each RF broadband channel is then applied to the appropriate DEMUX/MUX.

Because the vestigial sideband signals in the upstream direction on the line 201 originate at different subscriber locations they will likely arrive at the modulator/demodulator 206 with different phases which may vary over time. As a result, the network carrier recovered from these signals by the VSB modulator/demodulator 206 may also have a phase which varies with time. This phase variation of the network carrier, in turn, results in a phase distortion in each of the RF transmitting channels which is carried over to the RF receiving channels. Accordingly, communication amongst the channels suffers, particularly if data information is being transmitted.

In accordance with the principles of the present invention, the system 1 is further adapted to correct any such phase distortion in the RF transmitting and/or receiving channels, resulting from the varying phase of the regenerated network carrier. This is accomplished by modifying each subscriber location so that it generates a phase correction pilot tone having a fixed phase relationship with the corresponding RF transmitting channel at the subscriber location and so that the phase correction pilot tones of the subscriber locations occupy one or more dedicated phase correction pilot tone channels which are separate from the transmitting voice channels. It is further accomplished by modifying the equipment at the head end of the system 1 so that each phase correction pilot tone is extracted and then used to correct any phase distortion in its corresponding transmitting and/or receiving channels.

In the present illustrative case, two of the channels in each 60 channel FDM sub-group of the RF transmitting channels are reserved or dedicated for service as the phase correction pilot tone channels. More particularly, the channels 30 and 60 in each transmitting channel FDM sub-group are used to carry the pilot tones for the transmitting channels 1–29 and 31–59, respectively, of that sub-group. Each phase correction pilot tone has a unique frequency which allows the tone to be separated using frequency selective detection equipment from the other phase correction pilot tones in its channel. Each tone, furthermore, has a fixed phase relationship with the corresponding RF receiving channel and its associated information and experiences the same phase distortion experienced by such channel and information in traveling to the head end of the system 1.

As a result of including the two phase correction channels in each RF transmitting channel FDM sub-group, passage of the sub-group through its respective TRANSMUX will result in each of the transmitting TDM digital signals output from the TRANSMUX having one of the phase correction channels. By utilizing a phase regenerator to operate on each TDM signal from each output line from each TRANSMUX, the phase correction pilot tones can be retrieved and used to correct the phase of the respective transmitting channels and their corresponding information carried by the TDM signal.

In FIG. 1B, phase regenerators 1101 and 1201 are shown as operating on the first and second transmitting TDM signals output from TRANSMUX 401A. These signals contain transmitting digital channels 1–29 and phase correction channel 30 and transmitting digital channels 31–59 and phase correction channel 60. While not shown in the drawing, similar phase regenerators are used to operate on the first and the second TDM signals output from each of the other TRANSMUXES in the converter 4A, as well as on the first and second signals output from each of the TRANSMUXES in each of the other converters 4B–4M. Additionally, these phase regenerators are all of like construction and operation. Thus, only the phase regenerator 1101 and its operation will be described.

As shown, the phase regenerator 1101 operates in the digital domain and comprises a digital time division demultiplexer and converter 1102, a digital converter and time division multiplexer 1103, a digital frequency-selective phase detector 1104 and digital phase shifters 1105A through 1105CC. Each phase shifter corresponds to one of the 29 digital transmitting channels in the first transmitting TDM signal output from TRANSMUX 401A.

The demultiplexer and converter 1102 separates and outputs in parallel the different channels carried in the first transmitting TDM signal, i.e., the transmitting digital channels 1–29, the phase correction pilot channel 30 and the common signaling channel. The common signaling channel is then directly fed into the converter and time division multiplexer 1103, while the transmitting channels 1–29 are fed into the respective phase shifters 1105A to 1105CC, respectively, and the phase correction pilot tone channel is fed into the frequency selective phase detector 1104.

The frequency selective phase detector 1104 extracts each phase correction pilot tone from the phase correction pilot tone channel. From each extracted phase correction pilot tone, the phase detector then determines a relative phase correction signal for correcting the phase distortion which has occurred in the corresponding transmitting channel and the information in that channel due to passage over the cable 201. Each phase correction signal is then input to the phase shifter receiving the corresponding transmitting channel which has its phase corrected based on the signal.

The phase corrected transmitting channels are then applied to the converter and time division multiplexer 1103. The multiplexer 1103 reestablishes from the phase corrected transmitting channels and the common channel a phase corrected transmitting TDM signal which is then input to the DTU 301A. This signal is then operated on and switched by the TDM switch 302 as above-discussed.

In carrying out its demultiplexing and converter functions, the unit 1102 performs line signal decoding, framing and signaling de-multiplexing, clock and frame recovery, serial to parallel conversion and A-law to linear conversion. The converter and time division multiplexer 1103 performs the inverse of these functions. Also, as shown in FIG. 1B, the phase correction pilot tones carried in the channel 30 are used only within the phase regenerator 1101. However, these tones may also be included in the regenerator output for maintenance purposes. This can be accomplished by passing the channel 30 to the converter 1103 which assembles the channel in the phase corrected TDM signal output to the DTU 301A.

FIG. 7 shows a generator circuit 1301 added to the modulator/demodulator equipment at each subscriber location for generating a phase correction pilot tone. In the case shown, this tone is developed from the 4 KHz reference signal retrieved from the pilot tone in the received signal used for frequency synchronization.

More particularly, the 4 KHz signal is fed through a frequency divider 1302 where it is divided by 64 to result in a 62.5 Hz signal. This signal is then fed through a first preset multiplier 1303 where it is multiplied by N-70 or N-100, where N is the value of the multiplier used by circuit 805, to result in the phase correction pilot tone for the subscriber location.

The 4 KHz reference signal is also fed through a second preset multiplier 1304 where it is multiplied by 107 or 137, resulting in an output signal having a frequency of 428 KHz or 548 KHz. This signal is then modulated by the phase correction pilot tone signal using a SSB modulator 1305. The resultant signal is then fed into VSB modulator 807 for modulation onto the network carrier.

FIG. 7A shows the phase correction pilot tones for the transmitting channels of the first and second transmitting TDM signals output to the phase regenerators 1101 and 1201. For the first transmitting TDM signal having TDM transmitting channels 1–29 which correspond to 29 4 KHz RF transmitting channels spanning frequencies 312 KHz to 428 Khz, the phase correction pilot tones are at frequencies from 500 Hz to 2250 Hz spaced in increments of 62.5 Hz. These tones are carried in the channel 30 which spans the frequencies 428–432 KHz.

For the second transmitting TDM signal having the channels 31–59 which correspond to 29 4 KHz RF transmitting channels spanning frequencies 432–548, the phase correction pilot tones again are at frequencies from 500 Hz to 2250 Hz in increments of 62.5 Hz. In this case, the tones are carried in the channel 60, which spans the frequencies 548 KHz to 552 KHz.

It should be noted that while the phase regenerators 1101 and 1201 have been illustrated as units separate from the TRANSMUX 401A, some or all of the functions of the regenerators can be included in the TRANSMUX. Specifically, many of the above-mentioned functions performed by the regenerators are similarly performed by the TRANSMUX so that inclusion of the regenerators in the TRANSMUX would promote economy in equipment, if desired.

Figure 11:
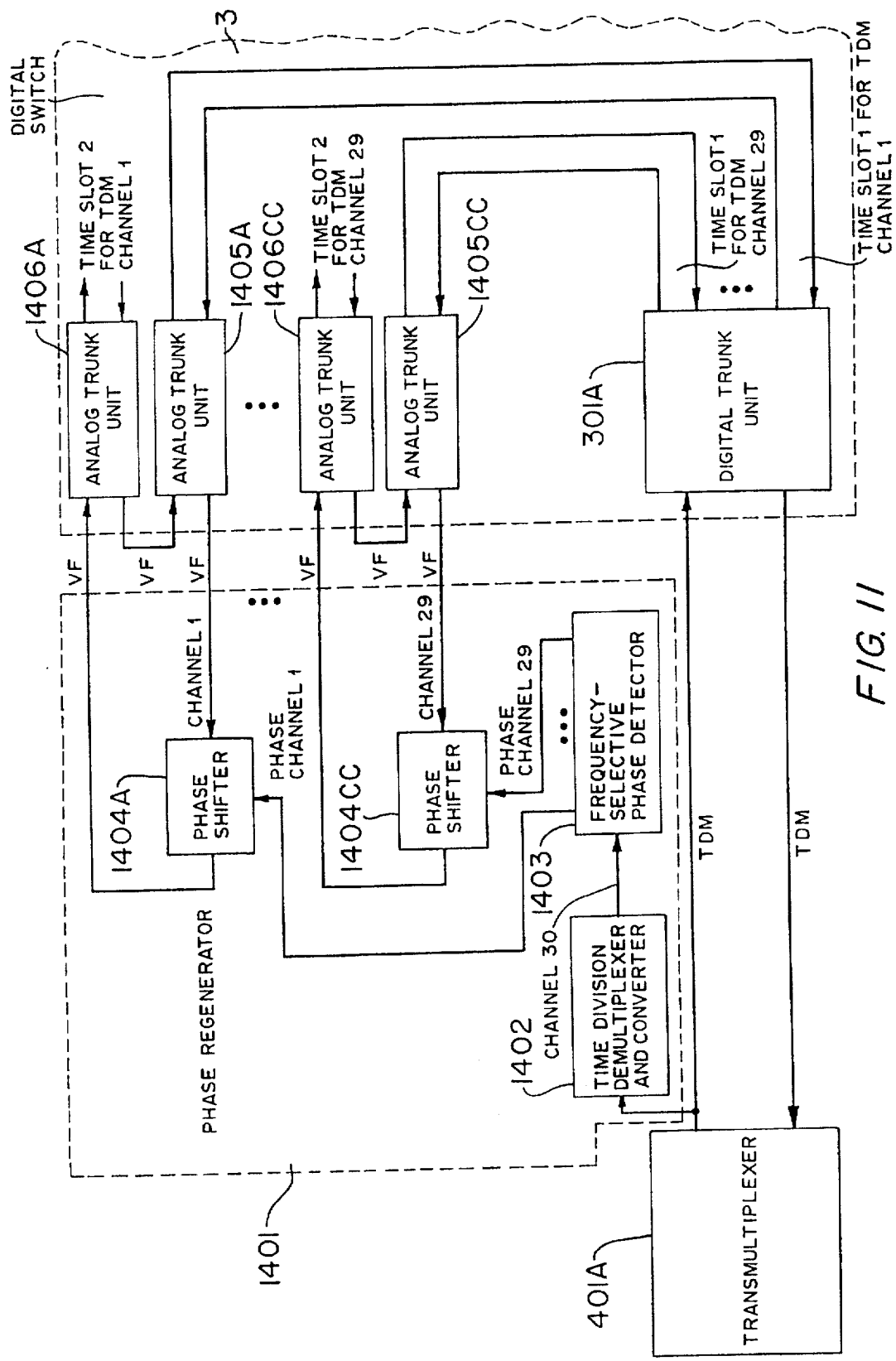
FIGS. 11 and 12 show alternative arrangements for realizing the phase correction employed in the video/voice distribution system of FIGS. 1A and 1B.

In the embodiment of the phase regenerator shown in FIGS. 1A and 1B, the phase regenerator provided phase correction for the transmitting channels exclusively in the digital domain using digital elements. It is also within the contemplation of the invention to perform phase correction using a phase regenerator which operates in the time and frequency domains and in the frequency domain exclusively. FIG. 11 shows the former type of phase regenerator and FIG.

12 shows the latter type of phase regenerator, each used in place of the regenerator 1101 in FIG. 1B. Both regenerators are shown as operating in conjunction with the DTU 301A and with analog trunk units in digital switch 3 to effect phase regeneration of transmitting channels 1-29 in the first transmitting TDM signal from the TRANSMUX 401A.

In the FIG. 11 embodiment, the phase regenerator 1401 includes a digital time division demultiplexer and converter 1402, a digital frequency selective phase detector 1403 and analog phase shifters 1404A to 1404CC. The first transmitting TDM signal from the TRANSMUX 401A is fed to its respective DTU 301A, where the transmitting digital channels 1-29 are assigned in parallel to particular ones of the time slots of the switch 3. Each digital channel via its time slot is then fed to one of the analog trunk circuits 1405A to 1405CC which converts the transmitting digital channel to a corresponding transmitting analog channel. Each transmitting analog channel is then fed to a respective one of the analog phase shifters 1404A to 1404CC.

The first transmitting TDM signal is also fed to the demultiplexer and converter 1402 which extracts the phase correction pilot tone channel 30 from the signal. The extracted channel is then fed to the frequency-selective phase detector 1403 which extracts the phase correction pilot tones corresponding to each of the transmitting channels. The phase detector then determines from each extracted tone the relative phase correction required to correct the phase distortion in the specific transmitting channel and its corresponding information. These signals are then fed to the appropriate phase shifters 1404A to 1404CC to cause the plane shifters to provide the needed phase correction to the transmitting analog channels output from the trunk circuits 1405A to 1405CC.

The corrected transmitting analog channels are then fed through another set of analog trunk circuits 1406A to 1406CC where they then are reconverted to transmitting digital channels assigned to a second set of time slots of the digital switch 3. In this way, the transmitting channels are phase corrected with units operating in the digital and analog domains.

Figure 12:
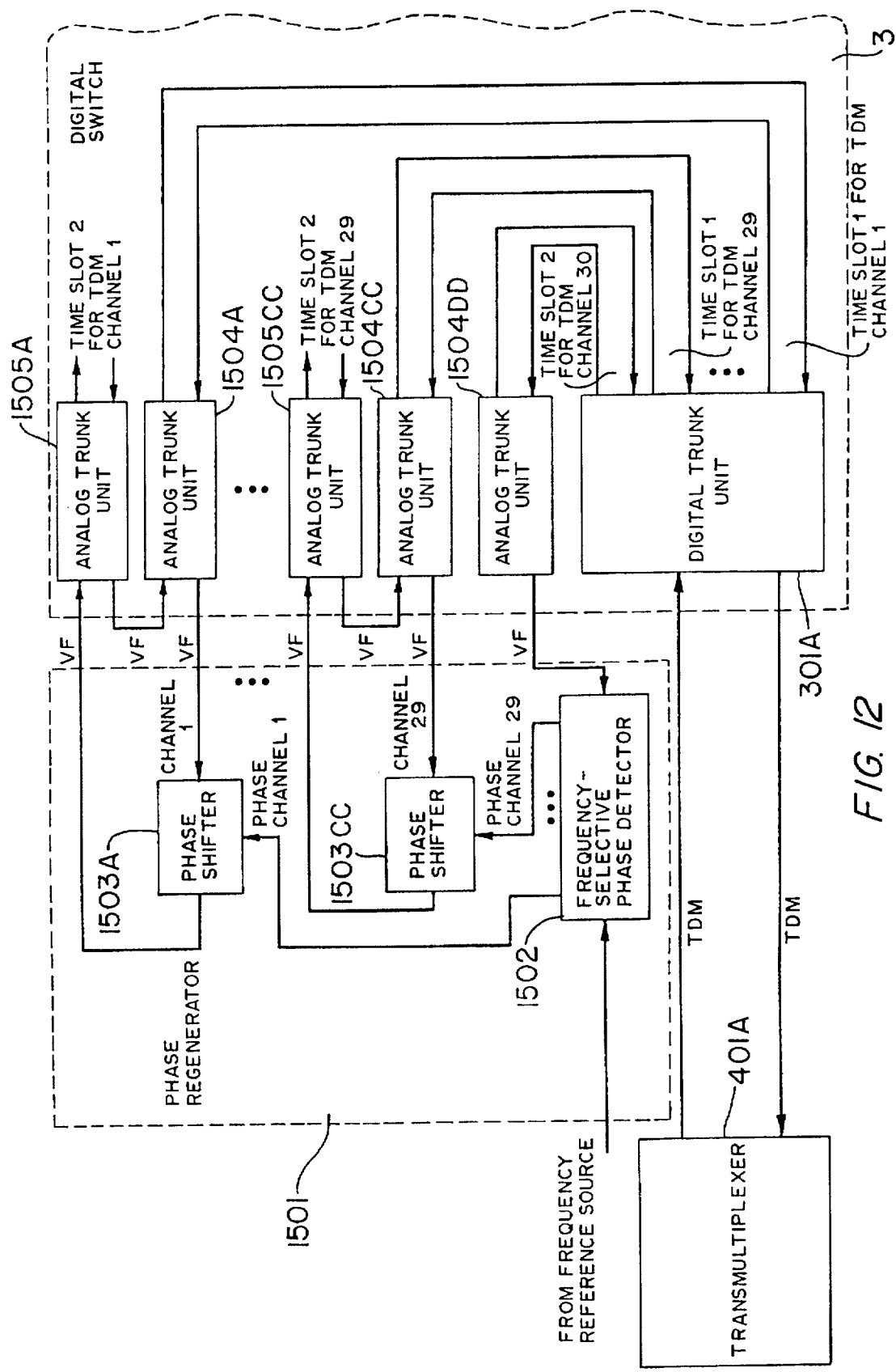

The phase regenerator embodiment of FIG. 12 is similar to the phase regenerator embodiment of FIG. 11, except that extraction of the tones in the channel 30 and regeneration of the phase correction signals also occur in the analog domain. This makes the regeneration process all analog in character.

As shown, the phase regenerator 1501 includes an analog frequency-selective phase detector 1502 and analog phase shifters 1503A to 1503CC. In this case, the digital phase correction pilot tone channel as well as the transmitting digital channels are assigned time slots in the switch 3 and separated by the DTU 301A. Each channel is then fed via its assigned time slot to one of the analog trunk circuits 1504A to 1504DD which converts the digital channel to an analog channel.

The analog phase correction pilot tone channel 30 is then fed to the analog frequency-selective phase detector 1502 which also receives an input from the 4 KHz frequency reference source 700 (see FIG. 6). The detector 1502 then extracts from the pilot tone channel 30 the individual analog phase correction pilot tones. These tones are then used to develop phase correction signals for correcting the phase distortion in their respective transmitting channels. The phase correction signals are fed to the phase shifters 1503A to 1503CC which also receive the transmitting analog channels from the analog trunk circuits, as in the FIG. 11 embodiment. The phase shifters then correct the phase of the analog channels and their respective information based on the phase correction signals. The resultant phase corrected analog channels are then fed to further analog trunk circuits 1505A to 1505CC to convert the analog channels to digital channels assigned to second time slots of the switch 3.

In all cases it is understood that the above-described arrangements are merely illustrative of the many possible specific embodiments which represent applications of the present invention. Numerous and varied other arrangements, can be readily devised in accordance with the principles of the present invention without departing from the spirit and scope of the invention.

What is claimed is:

1. A system comprising:

a plurality of telephone subscriber locations, each telephone subscriber location including means for establishing an RF transmitting channel, a phase correction pilot tone and an RF receiving channel associated with the subscriber location, said RF transmitting channel and RF receiving channel for conveying signalling and analog voice information from and to, respectively, said subscriber location;

said plurality of phase correction pilot tones of said subscriber locations forming one or more phase correction pilot tone channels separate from and external to said RF transmitting channels;

said RF transmitting channels of said subscriber locations and said one or more phase correction pilot tone channels forming one or more transmitting frequency-division-multiplexed signals, and said RF receiving channels of said subscriber locations forming one or more receiving frequency-division-multiplexed signals;

a broad band cable network for carrying the RF receiving and transmitting channels of said subscriber locations and said one or more phase correction pilot tone channels via said one or more transmitting frequency-division-multiplexed signals and said one or more receiving frequency-division-multiplexed signals;

and central means responsive to said cable network for enabling each RF transmitting channel in said one or more transmitting frequency-division-multiplexed signals on the cable network to be selectively coupled to any of said RF receiving channels in the one or more receiving frequency-division-multiplexed signals on the cable network, whereby voice and data communication between the subscriber locations of the coupled channels is enabled, said central means including:

phase correction means for recovering the phase correction pilot tones in said one or more phase correction pilot tone channels in said one or more transmitting frequency-division-multiplexed signals and correcting the phase of the information associated with each RF transmitting channel using the pilot tone corresponding to that RF transmitting channel.

2. A system in accordance with claim 1, wherein: said central means further comprises first means for establishing for each RF transmitting channel a transmitting digital channel for carrying digital voice information corresponding to the analog voice information carried by the RF transmitting channel, for establishing one or more first digital control channels for carrying the signalling information of the RF transmitting channels and for establishing one or more digital phase correction pilot tone channels for carrying the phase correction pilot tones in the one or more phase correction pilot tone channels, said transmitting digital channels, said one or more first digital control channels and said one or more digital phase correction pilot tone channels forming one or more transmitting time-division-multiplexed signals each of which containing a number of transmitting digital channels, a first control channel carrying the signalling information for said number of transmitting digital channels and a digital phase correction pilot tone channel carrying the phase correction pilot tones for said number of transmitting digital channels, said first means including transmultiplexer means for converting said one or more transmitting frequency-division-multiplexed signals into said one or more transmitting time-division-multiplexed signals;

digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, said digital switch means selectively coupling each transmitting digital channel in said one or more transmitting time-division-multiplexed signals to any of the receiving digital channels in said one or more receiving time-division-multiplexed signals;

and said transmultiplexer means of said first means converting said one or more receiving time-division-multiplexed signals to said one or more receiving frequency-division-multiplexed signals.

3. A system in accordance with claim 2, wherein:

said phase correction means is included in and part of said transmultiplexer means.

4. A system in accordance with claim 2, wherein:

said phase correction means follows said transmultiplexer means and operates on said one or more transmitting time-division-multiplexed signals.

5. A system in accordance with claim 4, wherein:

said phase correction means includes for each transmitting time-division-multiplexed signal: a time division demultiplexer for separating the transmitting digital channels, the digital phase correction pilot tone channel and the first digital control channel in that time division multiplexed signal; a frequency selective phase detector for detecting the phase of each phase correction pilot tone in the separated digital phase correction pilot tone channel; a phase shifter for each separated transmitting digital channel for adjusting the phase of the separated transmitting digital channel based on the detected phase of the phase correction pilot tone associated with that separated transmitting digital channel and detected by said frequency selective phase detector; and a time-division-multiplexer for multiplexing said phase adjusted transmitting digital channels and said separated first digital control channel to produce a phase adjusted transmitting time-division-multiplexed signal;

and said digital switch selectively coupling each of said phase adjusted transmitting digital channels in said one or more phase adjusted transmitting time-division-multiplexed signals to any one of the receiving digital channels in said one or more receiving time-division-multiplexed signals.

6. A system in accordance with claim 4, wherein:

said first means includes for each transmitting time-division multiplexed signal: separating and converting means for separating the transmitting digital channels in that transmitting time-division-multiplexed signal and converting the separated transmitting digital channels into transmitting analog channels; and reconverting means for reconverting the transmitting analog channels into transmitting digital channels;

and said phase correction means includes for each transmitting time-division-multiplexed signal: a time division demultiplexer for separating the digital phase correction pilot tone channel in that transmitting time-division-multiplexed signal; a frequency selective phase detector for detecting the phase of each phase correction pilot tone in the separated phase correction pilot tone channel; and a phase-shifter for each transmitting analog channel corresponding to a separated transmitting digital channel in that transmitting time-division-multiplexed signal for adjusting the phase of the transmitting analog channel based on the detected phase of the phase correction pilot tone associated with the corresponding separated transmitting digital channel prior to said transmitting analog channel being reconverted to a transmitting digital channel.

7. A system in accordance with claim 4 wherein:

said first means includes for each transmitting time-division-multiplexed signal: separating and converting means for separating the transmitting digital channels and the digital phase correction pilot tone channel in that time-division-multiplexed signal and converting the separated transmitting digital channels and the separated digital phase correction pilot tone channel into transmitting analog channels and an analog phase correction pilot tone channel; and reconverting means for reconverting each transmitting analog channel into a transmitting digital channel;

and said phase correction means includes for each transmitting time-division-multiplexed signal: an analog frequency selective phase detector for detecting the phase of each analog phase correction pilot tone in the separated analog phase correction pilot tone channel; and a phase shifter for each transmitting analog channel corresponding to a separated transmitting digital channel in that transmitting time-division-multiplexed signal for adjusting the phase of the transmitting analog channel based on the detected phase of the phase correction pilot tone associated with the corresponding separated transmitting digital channel prior to said transmitting analog channel being reconverted to a transmitting digital channel.

8. A system in accordance with claim 2 wherein:

said digital switch means comprises a time-division-multiplex switch.

9. A system in accordance with claim 8 wherein:

said cable network includes a number of RF broadband channels;

one or more groups of said transmitting frequency-division-multiplexed signals are carried in one or more of said RF broadband channels;

and one or more groups of said receiving frequency-division-multiplexed signals are carried in one or more of said RF broadband channels.

10. A system in accordance with claim 9 wherein:

said RF broadband channels are carried on said network on a network carrier; and said cable network includes: means for arranging said one or more groups of receiving frequency-division-multiplexed signals in said one or more RF broadband channels on said network carrier; and means for extracting said one or more groups of said one or more transmitting frequency-division-multiplexed signals from said one or more RF broadband channels carried on said network carrier.

11. A system in accordance with claim 10 wherein:

said transmultiplexer means includes means for separating from each other the transmitting frequency-division-multiplexed signals in each of said one or more groups of transmitting frequency-division-multiplexed signals extracted by said extracting means; and said transmultiplexer means further includes means for combining said one or more receiving frequency-division-multiplexed signals into said one or more groups of receiving frequency-division-multiplexed signals.

12. A method comprising:

for each of a plurality of telephone subscriber locations, establishing an RF transmitting channel, a phase correction pilot tone and an RF receiving channel associated with the subscriber location, said RF transmitting channel and RF receiving channel for conveying signalling and analog voice information from and to, respectively, said subscriber location;

said plurality of phase correction pilot tones of said subscriber locations forming one or more phase correction pilot tone channels separate from and external to said RF transmitting channels;

said RF transmitting channels of said subscriber locations and said one or more phase correction pilot tone channels forming one or more transmitting frequency-division-multiplexed signals, and said RF receiving channels of said subscriber locations forming one or more receiving frequency-division-multiplexed signals;

carrying the RF receiving and transmitting channels of said subscriber locations and said phase correction pilot tone channels on a broad band cable network via said one or more transmitting frequency-division-multiplexed signals and said one or more receiving frequency-division-multiplexed signals;

and using a central means to enable each RF transmitting channel in said one or more transmitting frequency-division-multiplexed signals on the cable network to be selectively coupled to any of said RF receiving channels in the one or more receiving frequency-division-multiplexed signals on the cable network, whereby voice and data communication between the subscriber locations of the coupled channels is enabled, said enabling of said central means including:

recovering the phase correction pilot tones in said one or more phase correction pilot tone channels in said one or more transmitting frequency-division-multiplexed signals and correcting the phase of the information associated with each RF transmitting channel using the pilot tone corresponding to that RF transmitting channel.

13. A method in accordance with claim 12, wherein:

said enabling by said central means further includes:

establishing for each RF transmitting channel a transmitting digital channel for carrying digital voice information corresponding to the analog voice information carried by the RF transmitting channel, establishing one or more first digital control channels for carrying the signalling information of the RF transmitting channels and establishing one or more digital phase correction pilot tone channels for carrying the phase correction pilot tones in the one or more phase correction pilot tone channels, said transmitting digital channels, said one or more first digital control channels and said one or more digital phase correction pilot tone channels forming one or more transmitting time-division-multiplexed signals each of which containing a number of transmitting digital channels, a first control channel carrying the signalling information for said number of transmitting digital channels and a digital phase correction pilot tone channel carrying the phase correction pilot tones for said number of transmitting digital channels, said steps of establishing including using a transmultiplexer means for converting said one or more transmitting frequency-division-multiplexed signals into said one or more transmitting time-division-multiplexed signals; and using a digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, and further using said digital switch means to selectively couple each transmitting digital channel in said one or more transmitting time-division-multiplexed signals to any of the receiving digital channels in said one or more receiving time-division-multiplexed signals; and using said transmultiplexer means of said first means to convert said one or more receiving time-division-multiplexed signals to said one or more receiving frequency-division-multiplexed signals.

14. A method in accordance with claim 13, wherein:

said phase correction means is included in and part of said transmultiplexer means.

15. A method in accordance with claim 13, wherein:

said step of recovering and correcting is carried out on said one or more transmitting time-division-multiplexed signals.

16. A method in accordance with claim 15, wherein:

said step of recovering and correcting includes for each transmitting time-division-multiplexed signal: separating the transmitting digital channels, the digital phase correction pilot tone channel and the first digital control channel in that time division multiplexed signal; detecting the phase of each phase correction pilot tone in the separated digital phase correction pilot tone channel; for each separated transmitting digital channel adjusting the phase of the separated transmitting digital channel based on the detected phase of the phase correction pilot tone associated with that separated transmitting digital channel and detected in said detecting step; and multiplexing said phase adjusted transmitting digital channels and said separated first digital control channel to produce a phase adjusted transmitting time-division-multiplexed signal;

and said step of using said digital switch means includes using said digital switch means to selectively couple each of said phase adjusted transmitting digital channels in said one or more phase adjusted transmitting time-division-multiplexed signals to any one of the receiving digital channels in said one or more receiving time-division-multiplexed signals.

17. A method in accordance with claim 15, wherein:

said enabling by said first means further includes for each transmitting time-division-multiplexed signal: separating the transmitting digital channels in that transmitting time-division-multiplexed signal and converting the separated transmitting digital channels into transmitting analog channels; and reconverting the transmitting analog channels into transmitting digital channels;

and said step of recovering and correcting further includes for each transmitting time-division-multiplexed signal: separating the digital phase correction pilot tone channel in that transmitting time-division-multiplexed signal; detecting the phase of each phase correction pilot tone in the separated phase correction pilot tone channel; and for each transmitting analog channel corresponding to a separated transmitting digital channel in that transmitting time-division-multiplexed signal adjusting the phase of the transmitting analog channel based on the detected phase of the phase correction pilot tone associated with the corresponding separated transmitting digital channel prior to said transmitting analog channel being reconverted to a transmitting digital channel.

18. A method in accordance with claim 15 wherein:

said enabling by said first means further includes for each transmitting time-division-multiplexed signal: separating the transmitting digital channels and the digital phase correction pilot tone channel in that time-division-multiplexed signal and converting the separated transmitting digital channels and the separated digital phase correction pilot tone channel into transmitting analog channels and an analog phase correction pilot tone channel; and reconverting each transmitting analog channel into a transmitting digital channel;

and said step of recovering and correcting further includes for each transmitting time-division-multiplexed signal: detecting the phase of each analog phase correction pilot tone in the separated analog phase correction pilot tone channel; and for each transmitting analog channel corresponding to a separated transmitting digital channel in that transmitting time-division-multiplexed signal adjusting the phase of the transmitting analog channel based on the detected phase of the phase correction pilot tone associated with the corresponding separated transmitting digital channel prior to said transmitting analog channel being reconverted to a transmitting digital channel.

19. A method in accordance with claim 13 wherein:

said digital switch means comprises a time-division-multiplex switch.

20. A method in accordance with claim 19 wherein:

said cable network includes a number of RF broadband channels;

one or more groups of said transmitting frequency-division-multiplexed signals are carried in one or more of said RF broadband channels;

and one or more groups of said receiving frequency-division-multiplexed signals are carried in one or more of said RF broadband channels.

21. A method in accordance with claim 20 wherein:

said RF broadband channels are carried on said network on a network carrier;

said carrying of said transmitting and receiving frequency-division-multiplexed signals on said RF broadband channels includes: arranging said one or more groups of receiving frequency-division-multiplexed signals in said one or more RF broadband channels on said network carrier; and extracting said one or more groups of said one or more transmitting frequency-division-multiplexed signals from said one or more RF broadband channels carried on said network carrier.

22. Apparatus for use with:

a plurality of telephone subscriber locations, each telephone subscriber location including means for establishing an RF transmitting channel, a phase correction pilot tone and an RF receiving channel associated with the subscriber location, said RF transmitting channel and RF receiving channel for conveying signalling and analog voice information from and to, respectively, said subscriber location, said plurality of phase correction pilot tones of said subscriber locations forming one or more phase correction pilot tone channels separate from and external to said RF transmitting channels, said RF transmitting channels of said subscriber locations and said one or more phase correction pilot tone channels forming one or more transmitting frequency-division-multiplexed signals, and said RF receiving channels of said subscriber locations forming one or more receiving frequency-division-multiplexed signals; and with a broad band cable network for carrying the RF receiving and transmitting channels of said subscriber locations and said one or more phase correction pilot tone channels via said one or more transmitting frequency-division-multiplexed signals and said one or more receiving frequency-division-multiplexed signals; said apparatus comprising:

central means responsive to said cable network for enabling each RF transmitting channel in said one or more transmitting frequency-division-multiplexed signals on the cable network to be selectively coupled to any of said RF receiving channels in the one or more receiving frequency-division-multiplexed signals on the cable network, whereby voice and data communication between the subscriber locations of the coupled channels is enabled, said central means including: phase correction means for recovering the phase correction pilot tones in said one or more phase correction pilot tone channels in said one or more transmitting frequency-division-multiplexed signals and correcting the phase of the information associated with each RF transmitting channel using the pilot tone corresponding to that RF transmitting channel;

and means adapted to couple said central means to said cable network.

23. An apparatus in accordance with claim 22, wherein:

said central means further comprises first means for establishing for each RF transmitting channel a transmitting digital channel for carrying digital voice information corresponding to the analog voice information carried by the RF transmitting channel, for establishing one or more first digital control channels for carrying the signalling information of the RF transmitting channels and for establishing one or more digital phase correction pilot tone channels for carrying the phase correction pilot tones in the one or more phase correction pilot tone channels, said transmitting digital channels, said one or more first digital control channels and said one or more digital phase correction pilot tone channels forming one or more transmitting time-division-multiplexed signals each of which containing a number of transmitting digital channels, a first control channel carrying the signalling information for said number of transmitting digital channels and a digital phase correction pilot tone channel carrying the phase correction pilot tones for said number of transmitting digital channels, said first means including transmultiplexer means for converting said one or more transmitting frequency-division-multiplexed signals into said one or more transmitting time-division-multiplexed signals;

digital switch means for establishing for each RF receiving channel a receiving digital channel for carrying digital voice information corresponding to the analog voice information carried by the RF receiving channel and for establishing one or more second digital control channels for carrying the signalling information of the RF receiving channels, said receiving digital channels and said second digital control channels forming one or more receiving time-division-multiplexed signals each of which containing a number of receiving digital channels and a second control channel carrying the signalling information for said number of receiving digital channels, said digital switch means selectively coupling each transmitting digital channel in said one or more transmitting time-division-multiplexed signals to any of the receiving digital channels in said one or more receiving time-division-multiplexed signals;

and said transmultiplexer means of said first means converting said one or more receiving time-division-multiplexed signals to said one or more receiving frequency-division-multiplexed signals.

24. An appaaratus in accordance with claim 23, wherein: said phase correction means is included in and part of said transmultiplexer means.

25. An apparatus in accordance with claim 23, wherein: said phase correction means follows said transmultiplexer means and operates on said one or more transmitting time-division-multiplexed signals.

26. An apparatus in accordance with claim 25, wherein: said phase correction means includes for each transmitting time-division-multiplexed signal: a time division demultiplexer for separating the transmitting digital channels, the digital phase correction pilot tone channel and the first digital control channel in that time division-multiplexed-signal; a frequency selective phase detector for detecting the phase of each phase correction pilot tone in the separated digital phase correction pilot tone channel; a phase shifter for each separated transmitting digital channel for adjusting the phase of the separated transmitting digital channel based on the detected phase of the phase correction pilot tone associated with that separated transmitting digital channel and detected by said frequency selective phase detector; and a time-division-multiplexer for multiplexing said phase adjusted transmitting digital channels and said separated first digital control channel to produce a phase adjusted transmitting time-division-multiplexed signal;

and said digital switch selectively coupling each of said phase adjusted transmitting digital channels in said one or more phase adjusted transmitting time-division-multiplexed signals to any one of the receiving digital channels in said one or more receiving time-division-multiplexed signals.

27. An apparatus in accordance with claim 25, wherein: said first means includes for each transmitting time-division-multiplexed signal: separating and converting means for separating the transmitting digital channels in that transmitting time-division-multiplexed signal and converting the separated transmitting digital channels into transmitting analog channels; and reconverting means for reconverting the transmitting analog channels into transmitting digital channels;

and said phase correction means includes for each transmitting time-division-multiplexed signal: a time division demultiplexer for separating the digital phase correction pilot tone channel in that transmitting time-division-multiplexed signal; a frequency selective phase detector for detecting the phase of each phase correction pilot tone in the separated phase correction pilot tone channel; and a phase-shifter for each transmitting analog channel corresponding to a separated transmitting digital channel in that transmitting time-division-multiplexed signal for adjusting the phase of the transmitting analog channel based on the detected phase of the phase correction pilot tone associated with the corresponding separated transmitting digital channel prior to said transmitting analog channel being reconverted to a transmitting digital channel.

28. An apparatus in accordance with claim 25 wherein: said first means includes for each transmitting time-division-multiplexed signal: separating and converting means for separating the transmitting digital channels and the digital phase correction pilot tone channel in that time-division-multiplexed signal and converting the separated transmitting digital channels and the separated digital phase correction pilot tone channel into transmitting analog channels and an analog phase correction pilot tone channel; and reconverting means for reconverting each transmitting analog channel into a transmitting digital channel;

and said phase correction means includes for each transmitting time-division-multiplexed signal: an analog frequency selective phase detector for detecting the phase of each analog phase correction pilot tone in the separated analog phase correction pilot tone channel; and a phase shifter for each transmitting analog channel corresponding to a separated transmitting digital channel in that transmitting time-division-multiplexed signal for adjusting the phase of the transmitting analog channel based on the detected phase of the phase correction pilot tone associated with the corresponding separated transmitting digital channel prior to said transmitting analog channel being reconverted to a transmitting digital channel.

29. An apparatus in accordance with claim 23 wherein: said digital switch means comprises a time-division-multiplex switch.

30. An apparatus in accordance with claim 29 wherein: said cable network includes a number of RF broadband channels;

one or more groups of said transmitting frequency-division-multiplexed signals are carried in one or more of said RF broadband channels;

and one or more groups of said receiving frequency-division-multiplexed signals are carried in one or more of said RF broadband channels.

31. An apparatus in accordance with claim 30 wherein:

said RF broadband channels are carried on said network on a network carrier; and said cable network includes: means for arranging said one or more groups of receiving frequency-division-multiplexed signals in said one or more RF broadband channels on said network carrier; and means for extracting said one or more groups of said one or more transmitting frequency-division-multiplexed signals from said one or more RF broadband channels carried on said network carrier.

32. An apparatus in accordance with claim 31 wherein:

said transmultiplexer means includes means for separating from each other the transmitting frequency-division-multiplexed signals in each of said one or more groups of transmitting frequency-division-multiplexed signals extracted by said extracting means; and said transmultiplexer means further includes means for combining said one or more receiving frequency-division-multiplexed signals into said one or more groups of receiving frequency-division-multiplexed signals.

* * * * *